US006377358B1

(12) United States Patent
Hayasaki et al.

(10) Patent No.: US 6,377,358 B1
(45) Date of Patent: Apr. 23, 2002

(54) METHOD FOR CORRECTING A RECORDING HEAD, CORRECTION APPARATUS THEREFOR, RECORDING HEAD CORRECTED BY USE OF SUCH APPARATUS, AND RECORDING APPARATUS USING SUCH RECORDING HEAD

(75) Inventors: Kimiyuki Hayasaki; Koji Yamakawa, both of Yokohama; Tsuyoshi Orikasa, Musashimurayama; Hiroyuki Kigami, Ebina; Hisashi Fukai, Yokohama; Takayuki Ono; Masayoshi Okawa, both of Kawasaki; Satoshi Kudo, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/219,896

(22) Filed: Dec. 24, 1998

(30) Foreign Application Priority Data

Dec. 26, 1997 (JP) ............................................ 9-359801

(51) Int. Cl.[7] .......................... B41B 15/00; H04N 1/21; H04N 1/034; B41J 3/00; B41J 29/377

(52) U.S. Cl. ...................... 358/1.16; 358/296; 358/298; 347/2; 347/3; 347/5; 347/19

(58) Field of Search ............................. 347/2, 5, 19, 7, 347/106, 14, 6, 3; 358/298, 296, 504, 406; 346/33 A

(56) References Cited

U.S. PATENT DOCUMENTS

| | | | | |
|---|---|---|---|---|
| 4,313,124 A | | 1/1982 | Hara | 346/140 R |
| 4,345,262 A | | 8/1982 | Shirato et al. | 346/140 R |
| 4,459,600 A | | 7/1984 | Sato et al. | 346/140 R |
| 4,463,359 A | | 7/1984 | Ayata et al. | 346/1.1 |
| 4,558,333 A | | 12/1985 | Sugitani et al. | 346/140 R |
| 4,608,577 A | | 8/1986 | Hori | 346/140 R |
| 4,723,129 A | * | 2/1988 | Endo et al. | 347/56 |
| 4,740,796 A | * | 4/1988 | Endo et al. | 347/56 |
| 5,016,023 A | | 5/1991 | Chan et al. | 346/1.1 |
| 5,172,134 A | | 12/1992 | Kishida et al. | 346/1.1 |
| 5,281,980 A | | 1/1994 | Kishida et al. | 346/140 R |
| 5,574,544 A | | 11/1996 | Yoshino et al. | 399/60 |

FOREIGN PATENT DOCUMENTS

| | | |
|---|---|---|
| EP | 0 347 341 | 12/1989 |
| EP | 0 527 610 | 2/1993 |
| EP | 0 532 248 | 3/1993 |
| EP | 0 670 219 | 9/1995 |
| EP | 0 729 115 | 8/1996 |
| JP | 54-56847 | 5/1979 |
| JP | 55-132253 | 10/1980 |
| JP | 59-123670 | 7/1984 |
| JP | 59-138461 | 8/1984 |
| JP | 60-71260 | 4/1985 |
| JP | 2-2009 | 1/1990 |
| JP | 4-229278 | 8/1992 |
| JP | 4-232749 | 8/1992 |
| JP | 5-24192 | 2/1993 |
| JP | 5-42683 | 2/1993 |
| JP | 6-34558 | 2/1994 |
| JP | 9-186877 | 7/1997 |

* cited by examiner

*Primary Examiner*—Edward Coles
*Assistant Examiner*—Twyler Lamb
(74) *Attorney, Agent, or Firm*—Fitzpatrick, Cella, Harper & Scinto

(57) ABSTRACT

A method for correcting a recording head is provided to solve the problems of density unevenness in recorded images. The density comparison is made with the reference density for a predetermined unit in the density distribution of an image recorded by the application of n kinds of signals. Then, one of the n kinds of signals which is close to the reference density is selected. The properties of the signal thus selected are transmitted to the recording head together with the correction data, hence correcting density unevenness.

20 Claims, 20 Drawing Sheets

| RECORDING ELEMENT UNIT NUMBER / CARRYING TIME OF CURRENT FOR RECORDING | 1 | 2 | ----- | M |
|---|---|---|---|---|
| (1) CARRYING TIME CALCULATED BY RESISTANCE OF RECORDING ELEMENT UNIT | 3.75 μs | 3.625 μs | ----- | 3.625 μs |
| (2) PULSE WIDTH OF STANDARD PATTERN AVERAGE OF (1)×α (α=0.27) | 0.875 μs | | | |
| (3) WAVEFORM OF DRIVE PULSE SUPPLIED TO RECORDING ELEMENT UNIT (WAVEFORM OF PULSE IN RECORDING BY STANDARD PATTERN) | PRE-PULSE MAIN PULSE 0.875 μs 2.875 μs | PRE-PULSE MAIN PULSE 0.875 μs 2.75 μs | ----- | PRE-PULSE MAIN PULSE 0.875 μs 2.75 μs |

FIG. 7

| RECORDING ELEMENT NUMBER / CORRECTION PARAMETER | 1 | 2 | 3 | -------- | MxN-1 | MxN |
|---|---|---|---|---|---|---|
| (1) PRE-HEAT 0.875 μs | 0.41 | 0.35 | *0.44 | -------- | 0.42 | 0.38 |
| (2) PRE-HEAT 1.000 μs | *0.44 | 0.37 | 0.47 | -------- | *0.43 | 0.40 |
| (3) PRE-HEAT 1.125 μs | 0.46 | 0.39 | 0.49 | -------- | 0.45 | *0.42 |
| (4) PRE-HEAT 1.25 μs | 0.48 | *0.43 | 0.51 | -------- | 0.47 | 0.45 |
| ⋮ | ⋮ | ⋮ | ⋮ | ⋮ | ⋮ | ⋮ |
| (10) PRE-HEAT 2.0 μs | 0.62 | 0.51 | 0.67 | -------- | 0.60 | 0.60 |
| SELECTED CORRECTION PARAMETER | (2) | (4) | (1) | | (2) | (3) |

FIG. 8

METHOD FOR CORRECTING A RECORDING HEAD, CORRECTION APPARATUS THEREFOR, RECORDING HEAD CORRECTED BY USE OF SUCH APPARATUS, AND RECORDING APPARATUS USING SUCH RECORDING HEAD

BACKGROUND OF THE INVENTION

1. Field of the Invention

The present invention relates to a method for correcting a recording head, and a recording head corrected by use of the correction apparatus, and also relates to a recording apparatus using such recording head. More particularly, the invention relates to a correcting method of the recording head, for correcting driving for a specific number of recording elements, for example. The invention also relates to an apparatus therefor, and a recording head corrected by use of such apparatus, and a recording apparatus using such head as well.

2. Related Background Art

A printing apparatus, or the printer unit provided for a copying machine, a facsimile equipment or the like is structured to record images each formed by dot patterns on a recording medium such as a paper sheet, a thin plastic plate or a cloth, in accordance with image information.

Of such printing apparatuses, a particular attention is given to a printing apparatus that mounts thereon a recording head of ink jet type, thermal type, LED type or the like as a low-cost apparatus. Such apparatus is usually structured with a plurality of printing elements, arranged on a substrate, corresponding to a number of dots to be printed.

In a recording head having the printing elements (recording elements) arranged corresponding to a printing width, since the printing elements are constituted in the same processes as those of the semiconductor manufacture, there has been a tendency in recent years that the conventional mode in which the driving integrated circuit is produced as a separate device is being developed into a mode in which the driving circuit is incorporated as one structure on the same substrate having printing elements arranged thereon. As a result, a structure of the circuit for driving the recording head is prevented from being complicated, and the printing apparatus is made smaller accordingly, thus attaining the significant reduction of manufacture costs.

Particularly, the ink jet recording method is of the type that thermal energy is applied to ink to generate bubbles and discharge the ink by pressure of the bubbles, and it has an excellent responsability to recording signals. This method also has an advantage that the discharge ports can be arranged in higher density. As compared with other recording methods, therefore, the ink jet recording method is remarkable very much.

In a case where a recording head is manufactured by utilizing the semiconductor manufacturing techniques, it is extremely difficult to produce all the printing elements without defects particularly in arrangement of a number of printing elements all over the surface of a substrate in order to cover a recording width. As a result, the production yield of recording heads is poor in the manufacture processes, hence making the costs higher inevitably. In some case, then, the manufacture of the head cannot be realized from the viewpoint of the manufacturing costs.

In this respect, therefore, there has been proposed a method for obtaining an elongated recording head that meets a required recording width by providing a plurality of recording heads whose production yield is higher, such as those provided with the printing elements each having a comparatively smaller number of ink discharge ports of 32, 48, 64, or 128 to be arranged in high precision on a substrate (or top and bottom thereof) in accordance with the density of arrangement of the printing elements as needed. A method of the kind is disclosed, for example, in Japanese Patent Application Laid-Open Nos. 55-132253, 2-2009, 4-229278, 4-232749, 5-24192, and the specification of U.S. Pat. No. 5,016,023, and among some others.

In recent years, it has become easier to manufacture a full-line recording head by arranging the printing devices, each having comparatively small numbers of ink discharge ports, such as 64 or 128, on a substrate, and then, aligning/adhering such substrate (hereinafter referred to as a printing component) in plural numbers on a base plate in good precision, in correspondence to the recording width as needed.

Here, however, although it has become easier to manufacture the full-line recording heads in this manner, there are still problems as hereinbelow.

For example, unevenness in the performances of printing components (substrates) thus arranged, unevenness in the performances of the printing elements in the vicinity of each gap between the printing components, and degradation of image quality caused by difference in density due to heat accumulation or the like per driving block for recording.

Particularly, in the case of the recording head of ink jet recording type, the production yield in its manufacture processes tends to be lowered not only by the problem of the variation between the printing elements in the vicinity of each gap between the printing components as arranged, but also, the problem of the ink fluidity that may be lowered by the presence of gaps between the printing components. Therefore, despite the high performance of a recording head of the kind the fact is that such recording head has not been promoted on the market.

Also, there is means for correcting the density unevenness of the recording head, such as a method disclosed in Japanese Patent Application Laid-Open No. 6-34558 wherein the density unevenness is corrected by measuring dot diameters. However, there is still a room for improvement as to the reproducibility of recorded dots. For example, when a one-line recording is executed, fine changes are noticed in the characteristics of recorded dots in the next line or several tens or several hundreds of lines later (which is termed as the fluctuation per recorded dot). Here, since a specific event (dot diameter) that includes this fluctuation is regarded as the data on the density unevenness, it is impossible to obtain a satisfying result with the execution of only one time of correction. In order to obtain a desired image, there is a need for obtaining the data on recorded dots several times for such correction. Further, when electric energy is to be converted into thermal energy in accordance with such correction data, the energy which is larger than a usual value is applied to the printing elements for low density. As a result, there is the failure in reliability regarding the durability of the recording head.

Further, in the estimation method using OD values, which is one of the conventional methods for correcting density unevenness, or the method of obtaining the correction data by estimating density unevenness from the variation of data on the dot diameters obtained in the manufacture processes of the recording head, there are the cases where the density unevenness is not corrected exactly, because there is not necessarily a good correlationship between the performance of a recording head.

SUMMARY OF THE INVENTION

The present invention is invented by taking into consideration the problems in the conventional apparatuses/methods as discussed above.

It is an object of the invention to provide a recording head which can be manufactured with a high production yield at lower costs by the execution of density unevenness correction reliably without giving any particular load to the recording head, and to provide a recording apparatus that uses such head as well.

It is another object of the invention to provide a method for correcting the head described above, and a correction apparatus therefor.

In order to achieve these objects, there is provided a method for correcting a recording head provided with a plurality of recording elements and memory means capable of storing data, comprises the steps of recording preliminarily recording patterns on a recording medium by use of the recording head in accordance with plural kinds of signals applied thereto; selecting one of the plural kinds of signals, for a predetermined unit of said recording elements, from the density distributions of the image pattern recorded on the recording medium so as to make the density of the recorded image equal to the reference density or the approximate value thereof; preparing as the correction data data for selecting one of the plural kinds of signals for a predetermined unit of the recording elements and storing the correction data on the memory means of the recording head as the initial correction data; and selecting either one of the initial correction data and the correction data output by the correction data controlling unit for generating arbitrary correction data for a predetermined unit of said recording elements and transmitting data to the recording head in accordance with the selected data.

The above-mentioned recording head is arranged to prepare the correction data stored on the memory means as the initial correction data fundamentally for correcting the density unevenness. A recording apparatus which mounts the recording head thereon is arranged to comprise a correction data controlling unit that generates arbitrary correction data, and transmission means for selecting one of the correction data output from the correction data controlling unit and the initial correction data to transmit to the recording head.

Also, in accordance with another aspect of the present invention, there is provided a method characterized by preparing correction data generating means that generates the correction data for the recording elements for a predetermined unit with reference to the image data corresponding to one line of the recording elements from the m-th line ($m=\log_2 n$) to the line immediately before, and selecting appropriately one of the correction data output by the correction data controlling unit for generating arbitrary correction data and the initial correction data.

With the structure described above, the present invention makes it possible to provide prints of higher quality without density unevenness, because the density unevenness correction data are stored as the initial correction data on the memory in the recording head and it is possible to select one of the initial correction data and the arbitrary correction data which are generated with reference to the image data or the like.

Also, in accordance with said another aspect of the present invention, it is possible to provide prints of higher quality without density unevenness by appropriately selecting one of the initial correction data and the correction data generated with reference to the image data corresponding to one line of the recording devices from the m-th line ($m=\log_2 n$) to the line immediately before.

BRIEF DESCRIPTION OF THE DRAWINGS

FIG. 7 is a view which shows the double pulse width for each unit for the execution of recording in accordance with the standard pattern.

FIG. 8 is a view which shows the OD values for each recording component obtainable from the test pattern recorded by changing the pre-heat pulse widths.

DETAILED DESCRIPTION OF THE PREFERRED EMBODIMENTS

Hereinafter, with reference to the accompanying drawings, the detailed description will be made regarding the preferred embodiments of the present invention.

(The Brief Description of the Apparatus Main Body)

Figure 1:
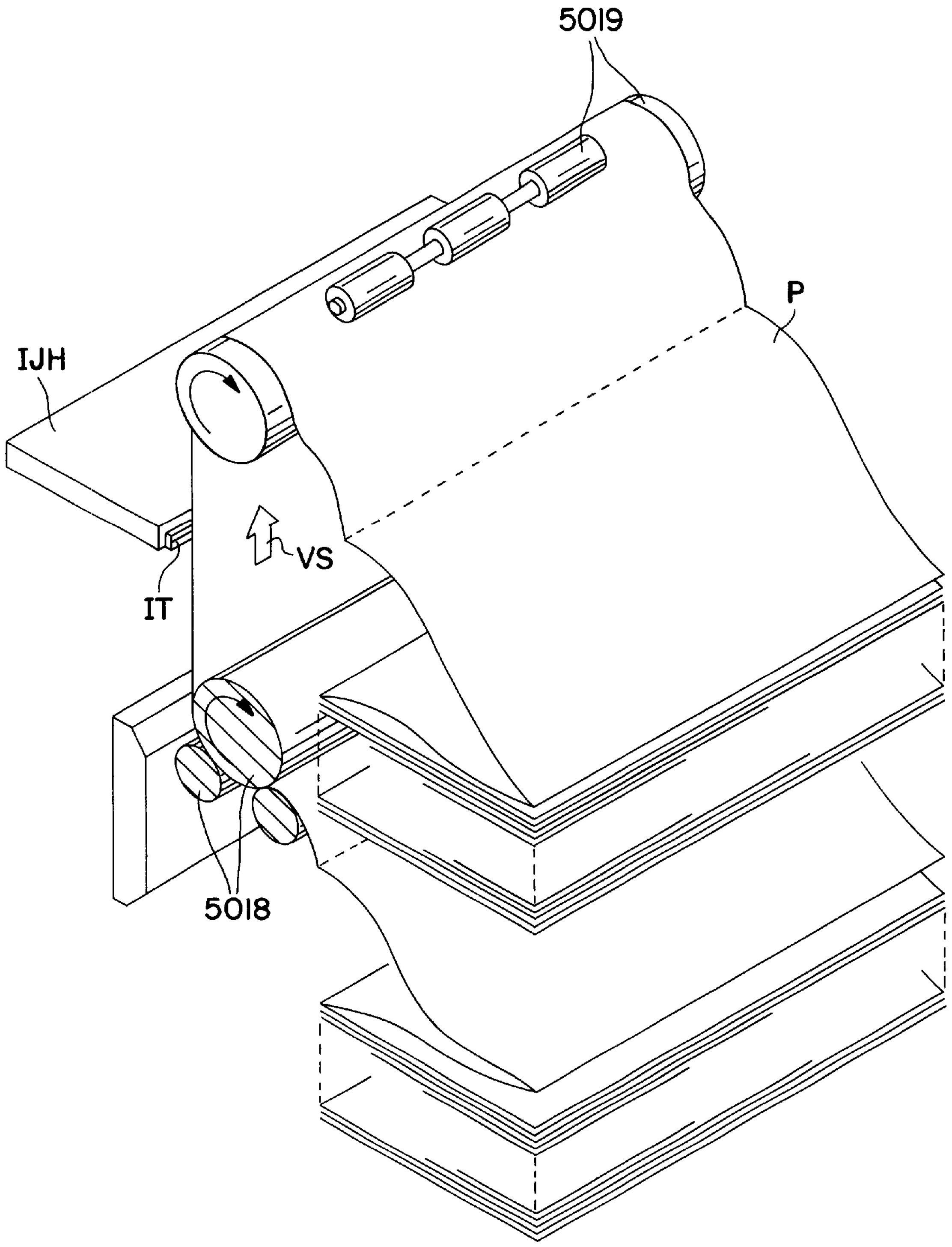
FIG. 1 is a view which schematically shows a full-line ink jet recording apparatus IJRA in accordance with the typical embodiment of the present invention.

FIG. 1 is a perspective view which shows an outer appearance of a principal part of a printer IJRA of ink jet recording type in accordance with a typical embodiment of the present invention. As shown in FIG. 1, the printer of ink jet recording type of the present embodiment comprises a recording head (full-multi-type of recording head) IJH arranged in a direction intersecting a carrying direction of a recording paper sheet (or a continuous sheet) P as a recording medium, which is provided with printing elements that discharge ink over the entire width of the recording paper sheet.

From discharge ports IN of the recording head IJH, ink is discharged to the recording paper sheet P at a predetermined timing. In accordance with the present embodiment, the recording sheet P, which is a continuous foldable sheet, is carried in the direction indicated by an arrow VS by a carrier motor of which driving is controlled by a control circuit which will be described later, so as to record an image thereon. Here, in FIG. 1, a reference numeral 5018 designates sheet carrier rollers; 5019, rollers on the exhaust side which hold the continuous recording sheet P in the recording position in cooperation with the carrier rollers 5018, and carry the recording sheet P in the direction indicated by the arrow VS in cooperation with the sheet carrier rollers 5018 which are driven by means of a driving motor (not shown).

Figure 2:
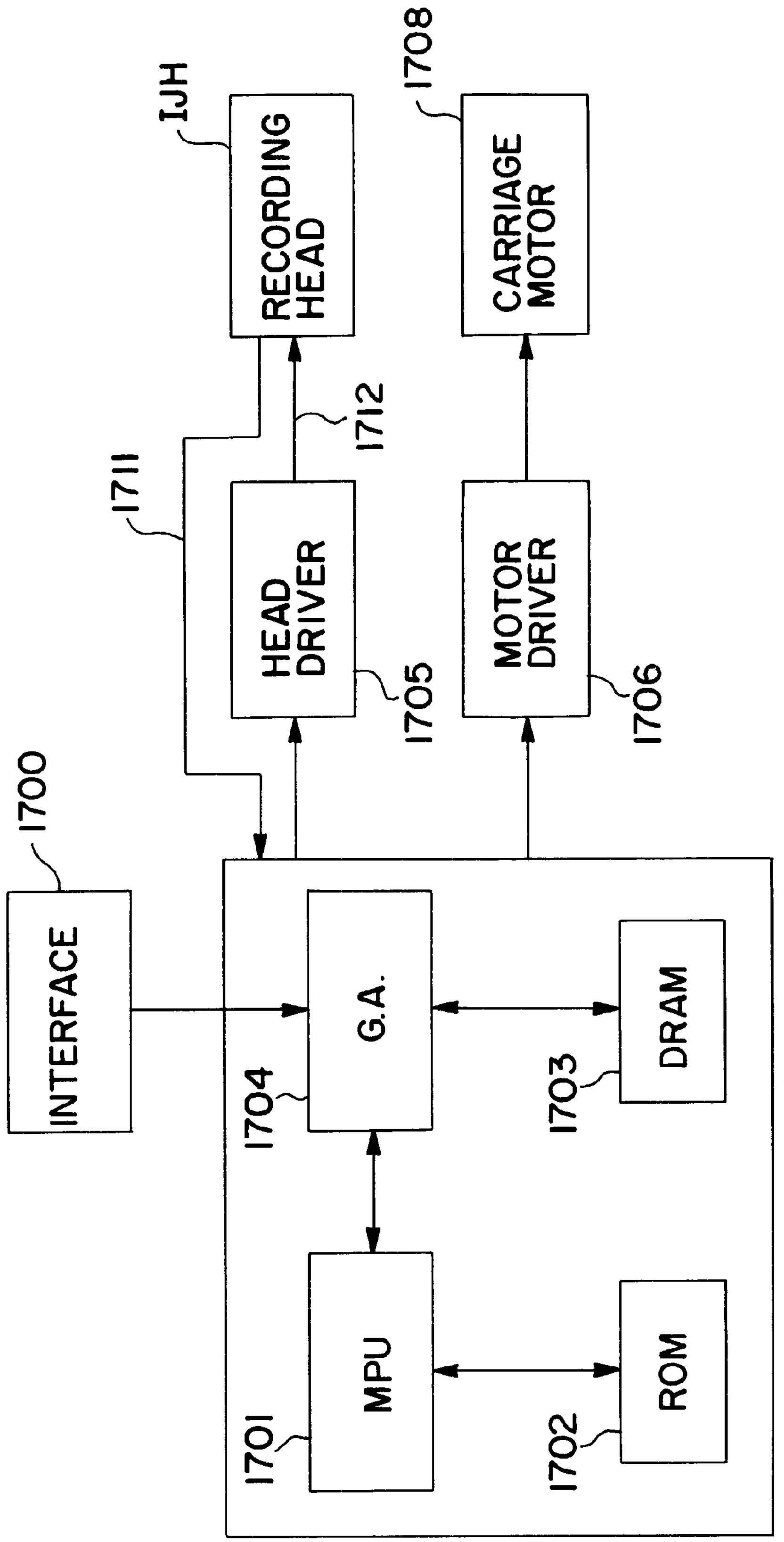
FIG. 2 is a block diagram which shows the controlling structure for the execution of the recording control of an ink jet recording apparatus.

FIG. 2 is a block diagram which shows the structure of the control circuit of the printer of ink jet type. In FIG. 2, a reference numeral 1700 designates an interface for inputting therethrough recording signals from an outside device such as a host computer; 1701, a MPU; 1702, a ROM for storing therein a control program to be executed by the MPU 1701 (which includes character fonts if needed); and 1703, a DRAM for temporarily storing various data (the aforesaid recording signals, recording data to be supplied to the head, or the like). A reference numeral 1704 designates a gate array (G.A.) for controlling the supply of recording data to the recording head IJH, and for also controlling data transfer between the interface 1700, the MPU 1701, and the RAM 1703; 1708, a carrier motor for carrying the recording sheet (the continuous sheet in accordance with the present embodiment); 1705, a head driver for driving the recording head; and 1706, a motor driver for driving the carrier motor 1708.

Now, an operation of the control circuit will be described briefly. The recording signals received through the interface 1700 are converted into recording data for printing by means of the gate array 1704 and the MPU 1701. Then, the motor driver 1706 is driven, and at the same time, the recording head IJH is driven in accordance with the recording data transferred to the head driver 1705, thus performing a recording operation.

Here, a reference numeral 1711 designates a signal line for monitoring sensors on each substrate (for example, a heat generating device resistance monitor 314, a temperature sensor 315, or the like shown in FIG. 14), and for transmitting initial correction data to a memory 13 (which will be described later) that stores correction data on the variation of each of the substrates (a heater boards 1000 to be described later) provided in the recording head IJH. Here, a reference numeral 1712 designates a signal line for pre-heat pulse signals, latch signals, heat pulse signals, or the like. The MPU 1701 transmits control signals to the recording head IJH through the signal line 1712 so that as for each of the substrates, uniform pixels may be formed in accordance with the initial correction data from the memory 13 in the recording head IJH.

Figure 10:
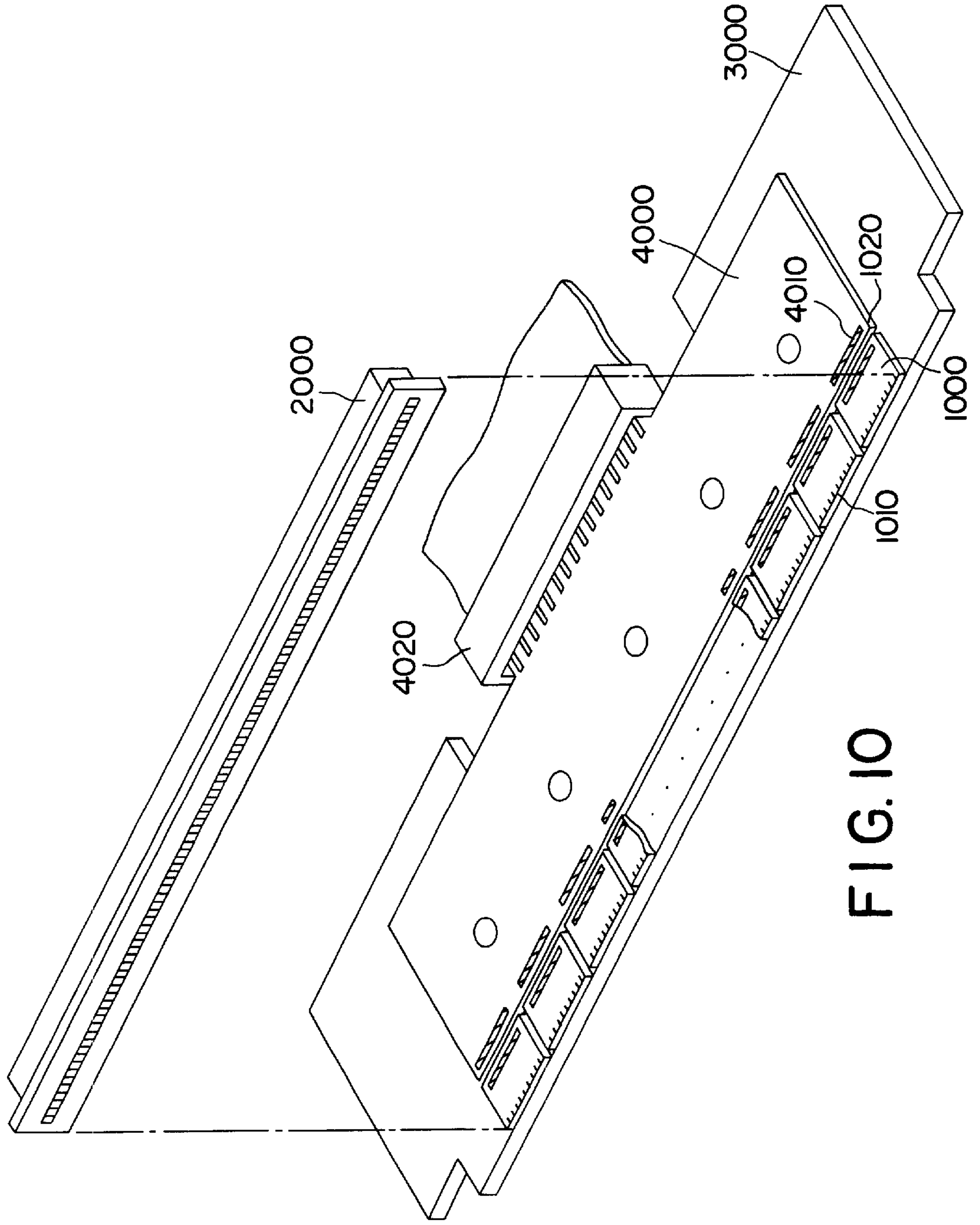
FIG. 10 is an exploded perspective view which illustrates the structure of a recording head in accordance with the present invention.

FIG. 10 is an exploded perspective view which shows the structure of the recording head IJH to which the present embodiment is applicable. In the recording head, the recording element (printing element) is a discharge energy generating element (in a bubble jet recording method each pair of electrodes and a heat generating resistor arranged between the electrodes), which is used for ink discharge.

In accordance with the method described hereunder, it becomes possible to obtain in an extremely high production yield an elongated (fill-line) recording head, which has been attempted to be formed without any defects all over the width by using such techniques as photolithographical process. Moreover, it becomes easier to make correction of the elongated (full-line) ink jet recording head unit by bonding onto this recording head a ceiling plate which is provided with a plurality of ink discharge ports formed on one end thereof and a plurality of grooves formed from said one end to the other and communicated with these discharge ports respectively, so as to cause the plurality of grooves to be closed by the substrate.

In accordance with the present embodiment, the description will be made on an ink jet recording head having the density of the ink discharge ports of 360 dpi (70.5 $\mu$m), and the numbers of the ink discharge ports of 3,008 nozzles (recording width of 212 mm).

In FIG. 10, the substrate (hereinafter referred to as a heater board) 1000 which serves as the printing components is provided with 128 discharge energy generating elements (recording elements) 1010 arranged in predetermined positions in the density of 360 dpi. Also, on the substrate, there are provided signal pads for driving the discharge energy generating elements 1010 at arbitrary timing by electric signals received from the outside, and power pads 1020 that supply electric power to drive the discharge energy generating elements.

A plurality of heater boards 1000 are arranged on a surface of a base plate 3000 formed by metallic or ceramics material, and adhesively fixed to the surface by bonding agent.

Figure 11:
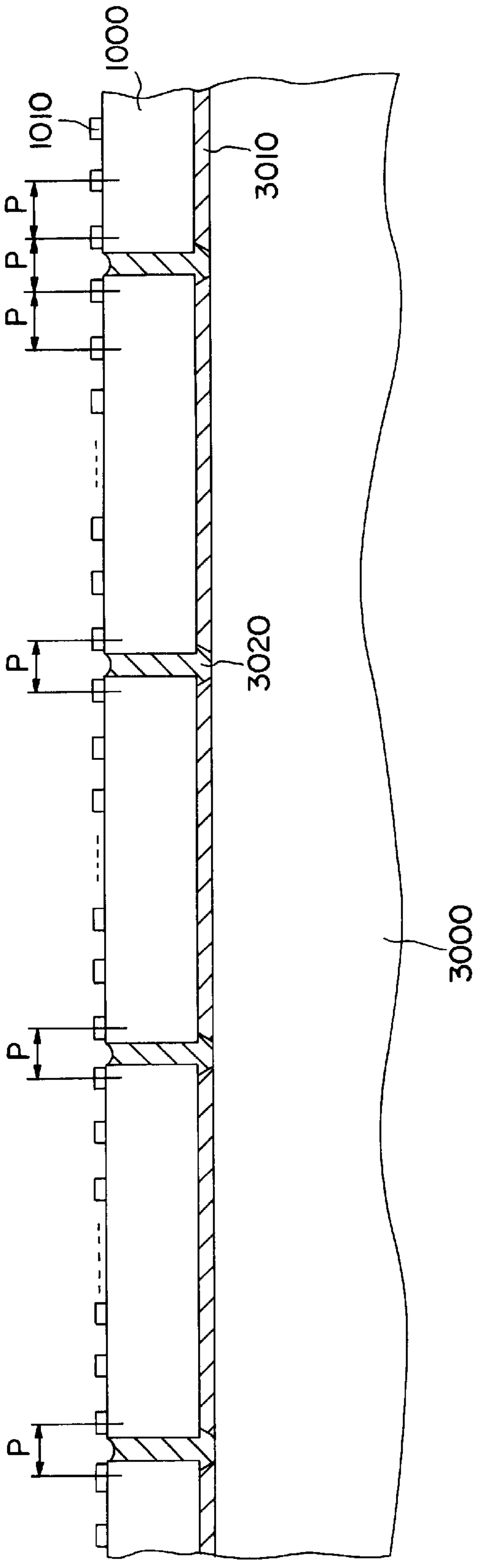
FIG. 11 is a detailed view which shows the state of aligned heater boards.

FIG. 11 is a detailed view which shows the state of the heater boards 1000 arrangement. Each of the heater boards 1000 is adhesively fixed to the predetermined position on the base plate 300° by the bonding agent 3010 applied in a predetermined thickness. At this juncture, the heater boards 1000 are adhesively fixed in good precision so that a distance between the discharge energy generating elements 1010 positioned at the ends of the respective two heater boards being adjacent may be equal to the pitch P (=70.5 $\mu$m) between the discharge energy generating elements on the heater board 1000. Also, each gap between the heater boards 1000 is sealed by sealant 3020.

Now, reverting to FIG. 10, a circuit board (PCB) 4000 is adhesively fixed to the base plate 3000 in the same manner as the heater boards 1000. In this case, the circuit board 4000 is adhesively fixed to the base plate 3000 so that the power pads 1020 on the heater boards 1000 are positioned closely to signal power supply pads 4010 on the wiring substrate. Also, a connector 4020 is provided for the circuit board 4000 in order to receive printing signals and driving power from the outside.

Now, a ceiling plate (or cover plate) 2000 will be described.

Figure 12D:
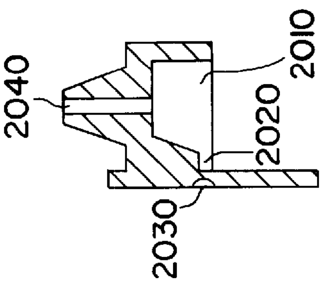
FIGS. 12A, 12B, 12C and 12D are views which illustrate the configuration of a ceiling plate.
Figure 12A:
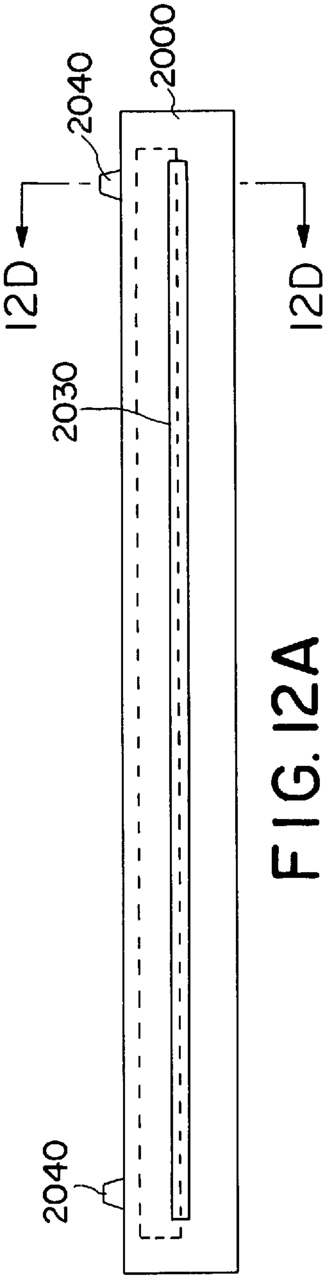
Figure 12B:
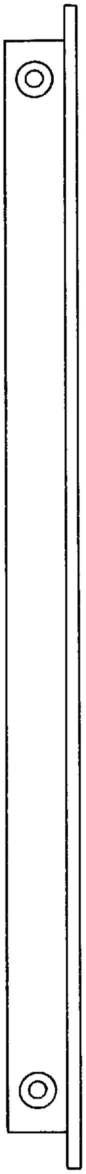
Figure 12C:
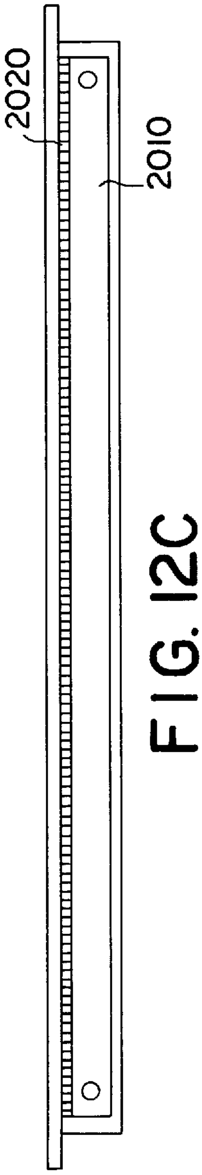

FIGS. 12A to 12D are views which illustrate the configuration of the ceiling plate 2000. FIG. 12A is a front view which shows the ceiling plate 2000. FIG. 12B is a top view of the ceiling plate shown in FIG. 12A. FIG. 12C is a bottom view thereof. FIG. 12D is a cross-sectional view, taken along line 12D—12D in FIG. 12A.

In FIGS. 12A to 12D, the ceiling plate 2000 comprises flow paths 2020 corresponding to the respective discharge energy generating elements 1010 provided for the heater boards 1000; orifices (discharge ports) 2030 arranged corresponding to the respective flow paths 2020, and communicated with the flow paths 2020 for discharging ink to an recording medium; the liquid chamber 2010 communicated with the respective flow paths for supplying ink to the flow paths 2020; and ink supply opening 2040 to allow ink supplied from an ink tank (not shown) to flow into the liquid chamber 2010. Naturally, the ceiling plate 2000 is formed in a length to substantially cover and close an array of the discharge energy generating elements structured by arranging a plurality of heater boards 1000 in line.

Here, again, reverting to FIG. 10, the ceiling plate 2000 is bonded to the heater boards 1000 with the extractly coincident positional relationship between the flow paths and the discharge energy generating elements (heat generating elements) 1010 on the heater boards 1000 arranged on the base plate 3000.

In this case, there are various bonding methods such as a method to press them together by a spring or another mechanical means, a method to bond them adhesively by use of bonding agent, or combination of these methods.

Figure 13:
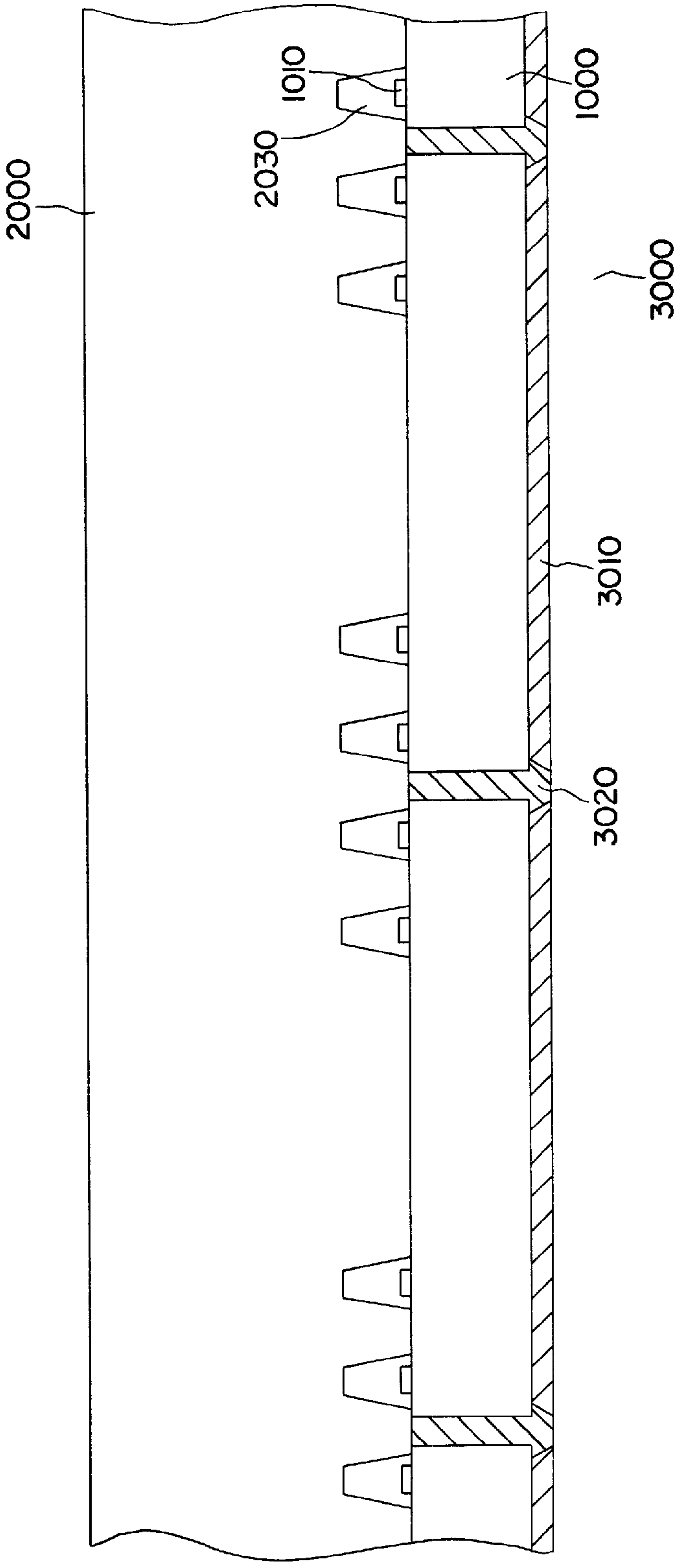
FIG. 13 is a view which shows the fixed state of the ceiling plate and heater boards.

By means of any one of the above methods, the ceiling plate 2000 and the heater boards 1000 are fixed together as shown in FIG. 13.

The ceiling plate 2000 described above can be manufactured by means of the known method, such as cutting or other mechanical machining, molding formation, injection molding, photolithography.

Figure 14:
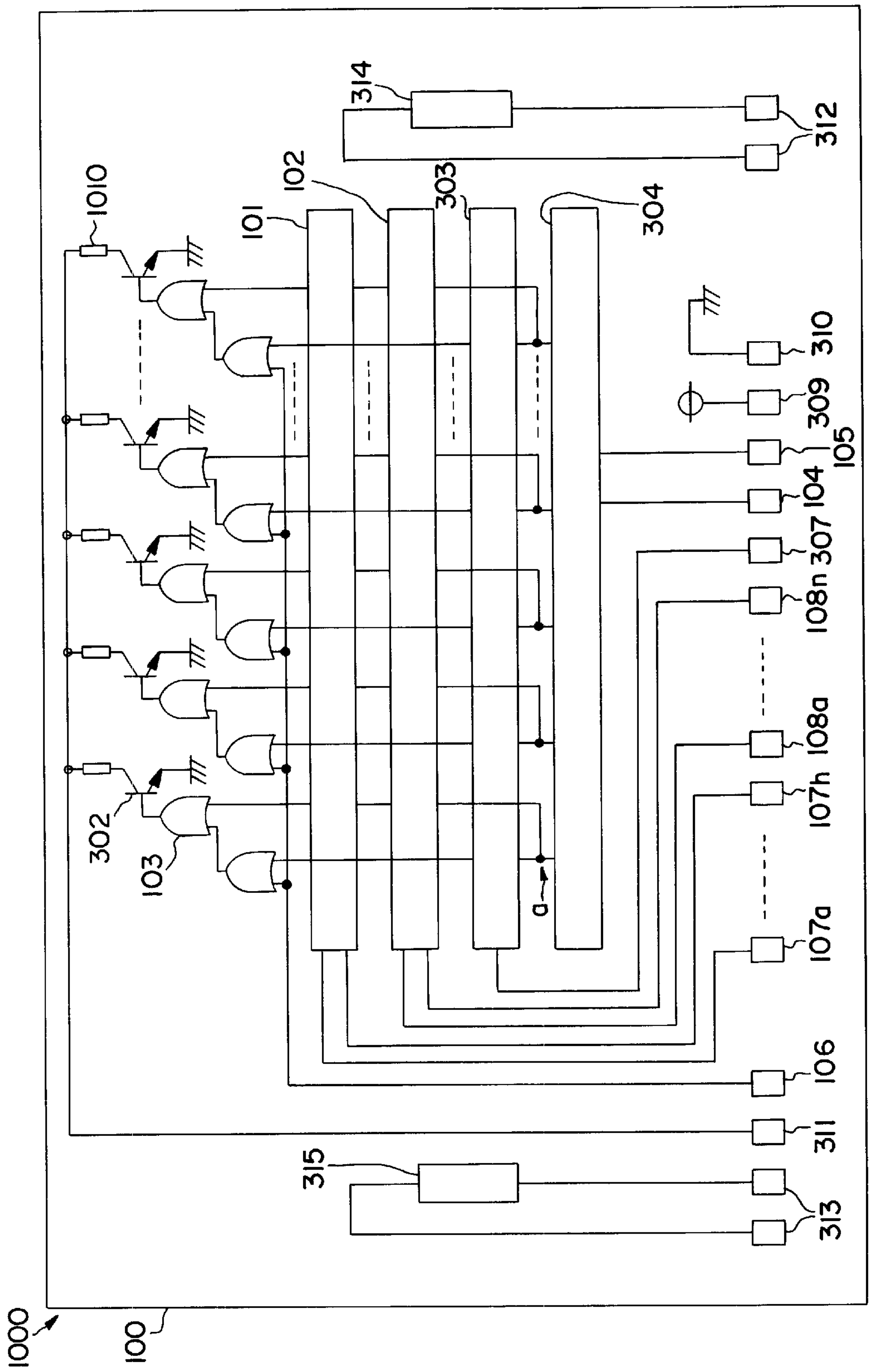
FIG. 14 is a view which shows the example of circuit structure of the driving circuit installed on the heater board.

FIG. 14 is a view which shows a block diagram of a driving circuit provided on the heater board 1000 for use of a recording head. Here, a reference numeral 100 designates a base member; 101 a logic block for selecting a pre-heat pulse; 102, latches for storing data for selecting the pre-heat pulse, which has the same circuit structure as that of a block (latches) 303 that temporarily stores image data; and 103, an OR circuit that combines the pre-heat pulse with a heat pulse.

Now, the description will be made on an operation of this driving circuit following a driving sequence thereof.

At first, a logic power source 309 is turned on. Then, data on each nozzle (the same data for one or four nozzles) for selecting the pre-heat pulse in accordance with previously measured characteristics of discharge amount (the discharge amount under pulse application of determined temperatures), is stored in the latches 102 by using a shift register 304 for inputting image data serially. Here, since the shift register 304 for use of image data input is also used to latch the pre-heat pulse selecting data, it is merely required that some latch circuits are added and an output of shift register 304 is divided in parallel as shown by the point a in FIG. 14. So, it becomes possible to prevent an element area from being increased with the exception of the latch circuits. Also, even when the number of pre-heat pulses becomes larger and thus the number of bits required for selecting pulses becomes greater than that of bits of the shift register 304, it becomes easier to cope with such situation by arranging the latches 102 in plural stages and providing plural latch clock input terminals 108*a* to 108*n* that determine latching. Further, it is required to store data for the pre-heat pulse selection described above only one time when the recording apparatus is initiated for operation, for example. Even if this function is made available for use, the transfer sequence of image data is still executable in the same manner as formerly. In addition, it may be possible to reduce into ¼ the required number of bits for the selection logic block 101 and the latches 102 for temporarily storing the selected data, thus making it possible to select and supply the pre-heat in units of four nozzles.

Now, the description will be made on the input of heat signals as a sequence subsequent to completion of the latching of the data as to the discharge amount so as to select pre-heat pulse.

The substrate described here is characterized in that the heat input terminal 106 is separately arranged from a plurality of pre-heat input terminals 107*a* to 107*n* for changing the discharge amount. At first, the value of the heat generating resistance monitor 314 is fed back, and then, in accordance with such value, the heating signal with the pulse width of appropriate energy for discharging ink is inputted from the recording apparatus side. Subsequently, from a plurality of pre-heat pulse terminals 107*a* to 107*n,* the pre-heat input is made so that each of the pre-heat signals changes the pulse width and timing depending on the value of the temperature sensor 315, and at the same time, it may vary the amount of discharge even at a specific (or determined) temperature in advance. In this manner, with a specific amount of ink discharge, unevenness and streaks can be eliminated by executing selection based on factors other than the temperature, that is, according to the amount of discharge for each of the nozzles. Then, one of the plural pre-heat pulses thus inputted is selected in accordance with the selected data latched temporarily in the pre-heat selection logic block (latches) 102 described earlier. Then, the pre-heat pulse thus selected and the AND signal between the image data and the heating signal are combined in the OR circuit 103 to drive a power transistor 302, hence enabling current to flow through each of the heat generating elements 1010 for discharging the ink.

Also, in FIG. 14, a reference numeral 104 designates an image signal input terminal; 105, a clock input terminal; 307, a latch signal input terminal; 310, a grounding terminal; 311, a power-source voltage input terminal for heat generation; 312, a data output terminal of the heat generating element resistance monitor; and 313, a data output terminal of an inner temperature of the recording head.

Figure 15:
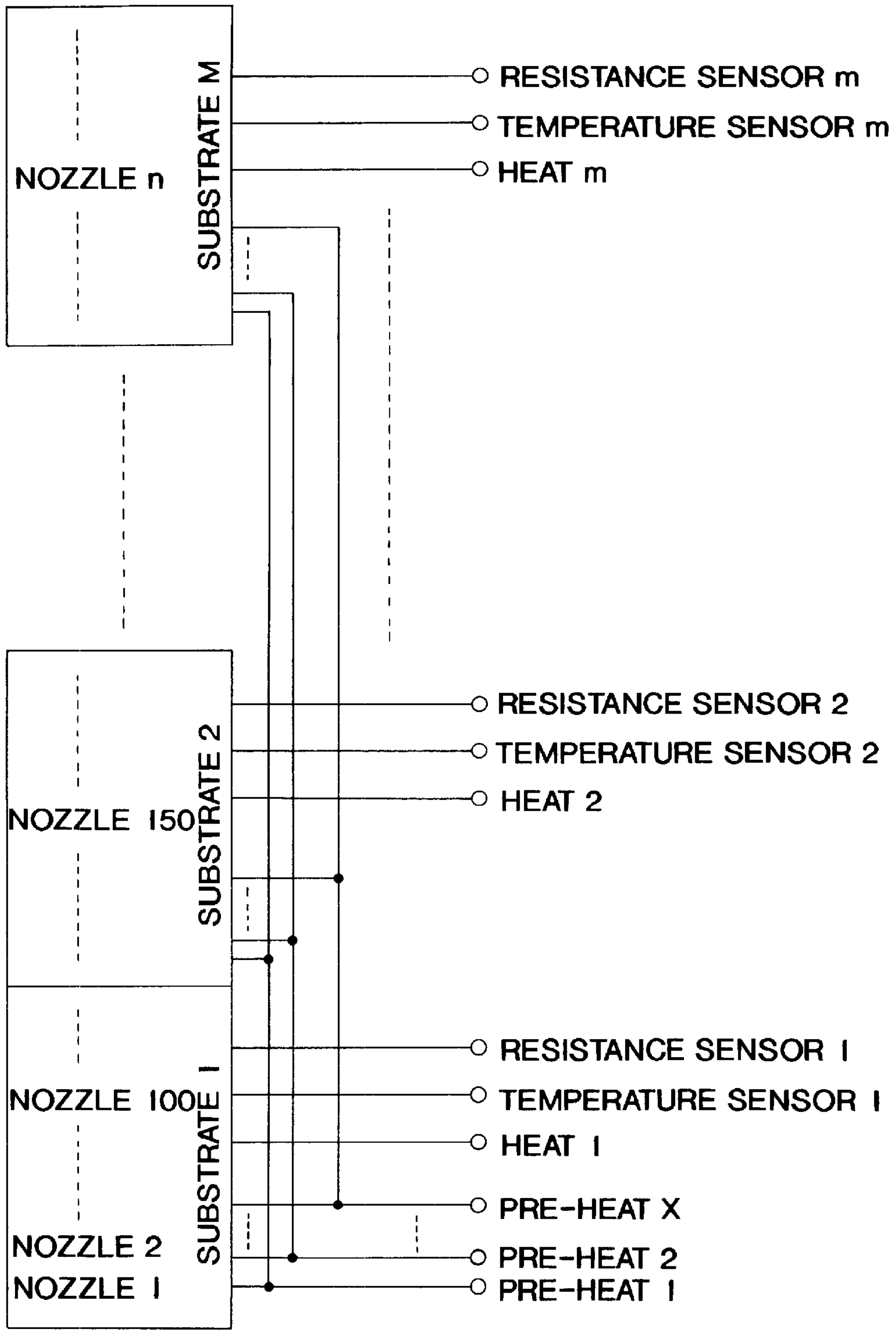
FIG. 15 is a block diagram which shows a multiple nozzle head structured by arranging many numbers of heater boards.

Here, with reference to FIG. 15, the description will be made on the structure of a multi-nozzle head which is structured with the arrangement of a plurality of heater boards (=substrates) 1000. In this respect, m substrates are arranged to make the total number of nozzles n, and then, the description will be made with attention given to nozzle 1 and nozzle 100 of the substrate 1, and nozzle 150 of the substrate 2.

Figure 16:
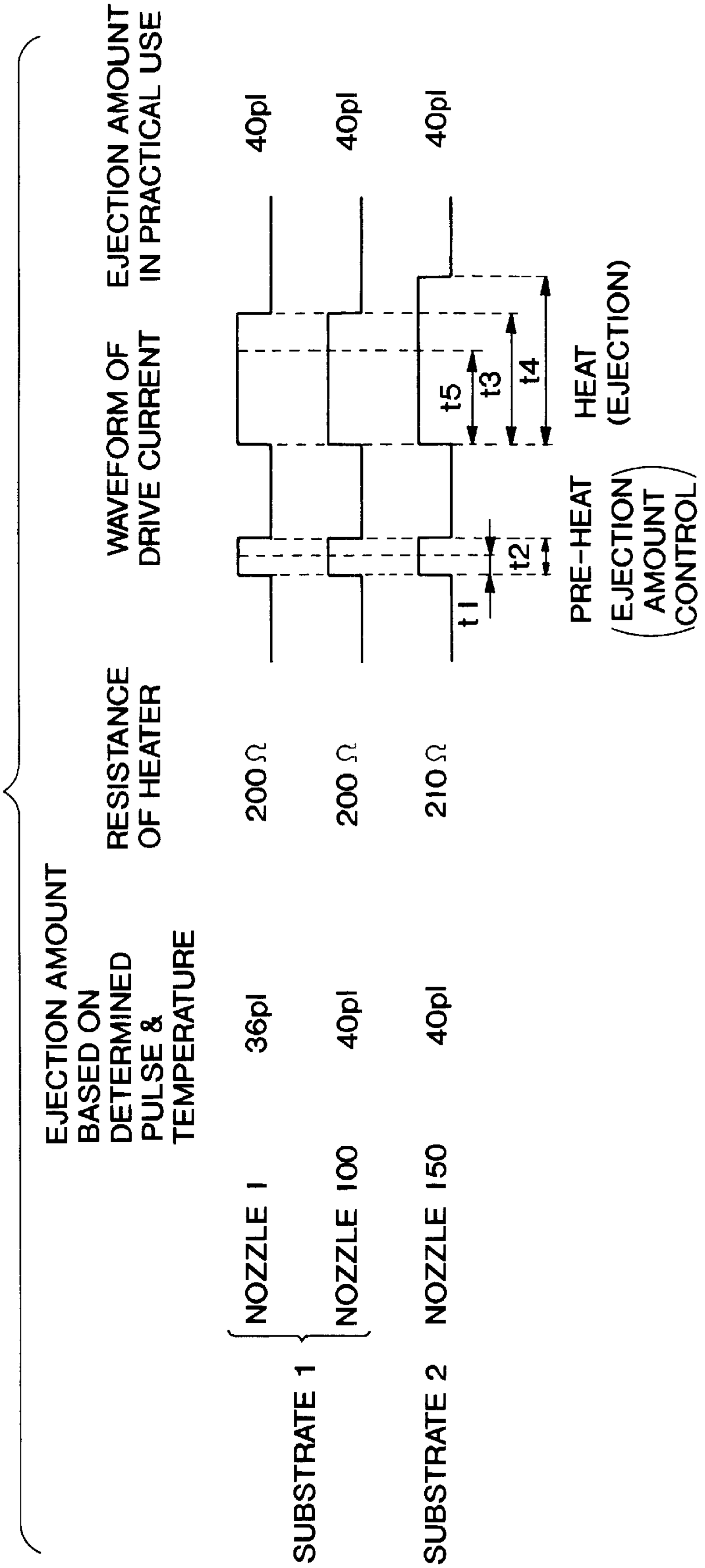
FIG. 16 is a view which shows one example of the waveform control of the driving current of the recording devices.
Figure 17:
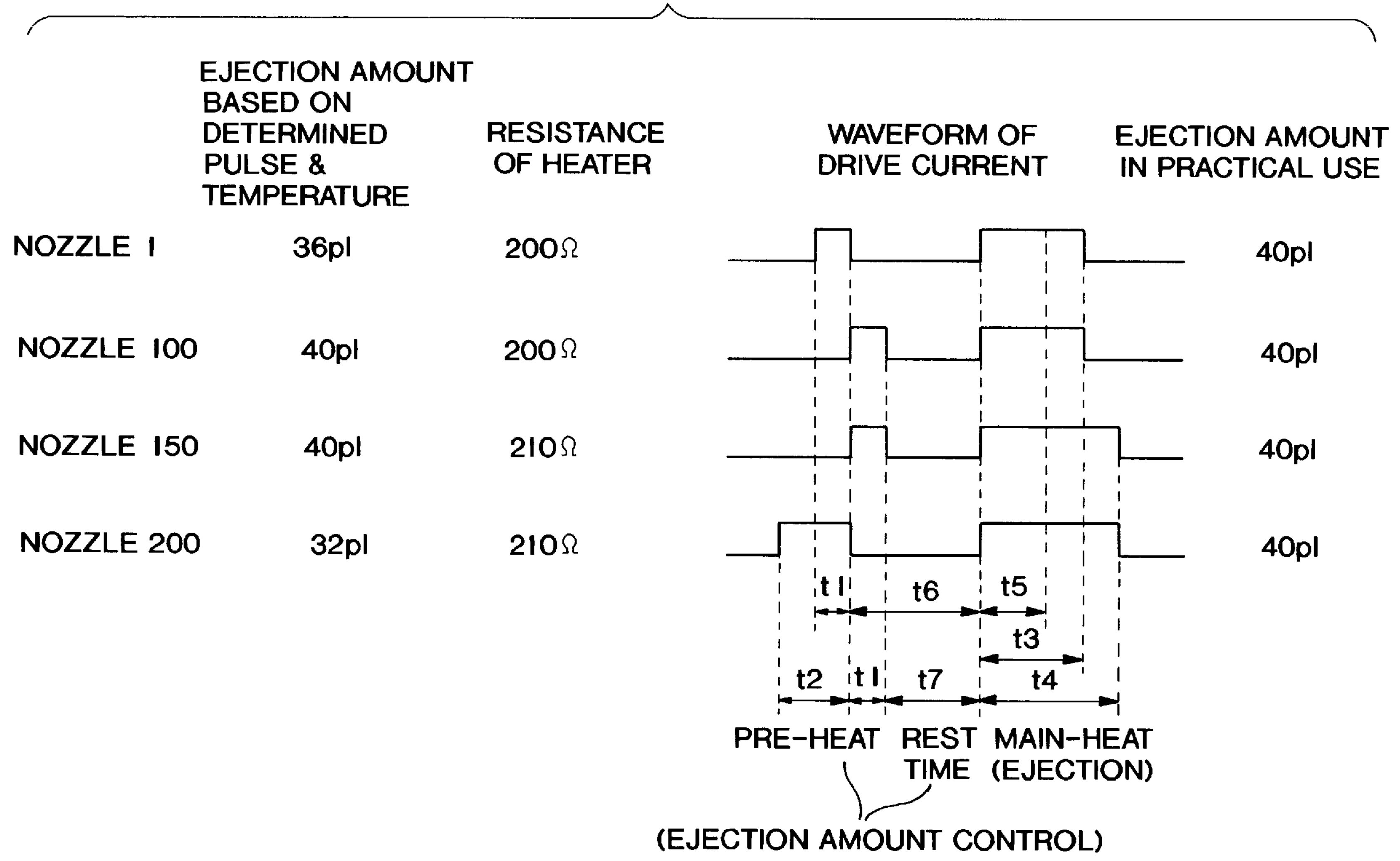
FIG. 17 is a view which shows the waveform of the driving current of the recording devices in accordance with the present embodiment.

As shown in FIG. 16, assuming that the amount of ink discharges by the application at a specific (or determined) temperature with a specific (or determined) pulse width are given as 36 pl for the nozzle 1, 40 pl for the nozzle 100, and 40 pl for the nozzle 150, selecting data for the nozzle is set in the latch so that the nozzle 1 may discharge the amount of ink larger than that of the nozzle 100 and nozzle 150. As to the heat pulse, on the other hand, the driving is made so that the pulse width applied to the substrate 2 is larger than that applied to the substrate 1, to apply constant power, because the heat generating element resistance value of the substrate 1 is 200 Ω, and that of the substrate 2 is 210 Ω as indicated by the resistance sensors 1 and 2 as shown in FIG. 16. FIG. 16 also shows the waveforms of driving currents when the driving is made in the conditions described above.

Here, it is understandable that the pre-heat pulse of the nozzle 1 whose discharge amount is smaller is larger than those of the nozzle 100 and 150 ($t1<t2$). Also, the heat pulse becomes t4>t3. Here, t5 indicates the minimum power required for causing droplets to fly by means of ink foaming, and there are relationships of t1, t2<t5, and t3, t4>t5.

In this way, it becomes possible to make the amount of ink discharges always 40 pl for all the nozzles in the actual driving by changing the pre-heat pulses within a range that satisfies the condition of t1<t2 and t1, t2<t5 against the temperature changes of the substrate in the driving operation. Then, the high quality recording is implemented without the creation of unevenness and streaks. At the same time, this implementation of recording may contribute to making the life of the recording head longer, because the pulse width is adjusted in accordance with the resistance value of each substrate with respect to the heat pulses which may require the larger power input so as to apply a reasonably constant power accordingly.

The MPU 1701 shown in FIG. 2 prepares several correction tables (not shown) on the ROM 1702, which are needed for the creation of arbitrary correction data transferred to the head driver 1705 of the recording head. Such data are selected appropriately in accordance with the kinds of image data immediately before printing or several lines before. For example, if all the printing image data continuously repeat black and white data uniformly, that is, represent 50% duty data or the like, the selection is made from several correction tables. If the data represent arbitrary dot patterns (image data or the like), the selection is made from the initial correction data. For this correction table, several patterns that issue random numbers are prepared to make it possible to select one of the n kind signals at random. With this technique, the density unevenness that may be noticeable by eye-sight is diffused for each recording element or in units of several recording elements (and also, for each line). In this manner, the uniform image formation is attained.

The density unevenness of an image is created by difference in the relative density contrasts of the recorded images formed by recording elements. Therefore, if such contrasts are made smaller, a density unevenness of the kind is no longer recognizable by eye-sight. Here, if the recording elements, which are capable of outputting recorded images with the high density, are concentrated spatially to a certain extent, it becomes recognizable that the density unevenness occur. Now, in terms of the density unevenness, the relationship between the amount of ink discharge and the density can be expressed experimentally in the following formula:

$$\Delta OD=0.02\times\Delta Vd$$

where the ΔOD is the change in densities, and the Vd is the amount of ink discharge. With this formula, it is indicated that the difference of discharge amounts of 1 to 4 pl (picoliter) make a change of approximately 0.02 to 0.08 in terms of the OD value conversion, for example. This means that an actual image is a set of recorded dots each having the factor that may create large variations, and particularly, if there is a difference of approximately 4 pl in the discharge amounts between the recording elements adjacent to each other, a considerably large difference in the contrast may take place between them eventually. However, if the recording density is approximately 300 to 600 dpi, it is impossible for eye-sight to compare the density unevenness of adjacent dots per dot unit.

The present invention effectively utilizes this property of eye-sight which has naturally a limit in recognizing the density unevenness. When an image is formed using the correction data on the initial density unevenness, the attention should be given to the durability of the recording head in relation to the designated energy correction which is continuously applied to each of the recording elements, and also, to the changes caused as the time elapses regarding density unevenness of the recording head corrected by the initial density unevenness correction data. Then, aside from the initial density correction data, it is made possible to cause control means to drive the array of recording elements per line so that the applied energy of each of them may be diffused appropriately in n stages when the recording data, which carries the comparatively same continuous patterns, are transferred to the recording head. As a result, when an image is formed, it becomes possible to obtain even densities by suppressing the initial density unevenness of the recording head, and then, by selecting the aforesaid control if the density unevenness occurs as the time elapses.

Figure 18:
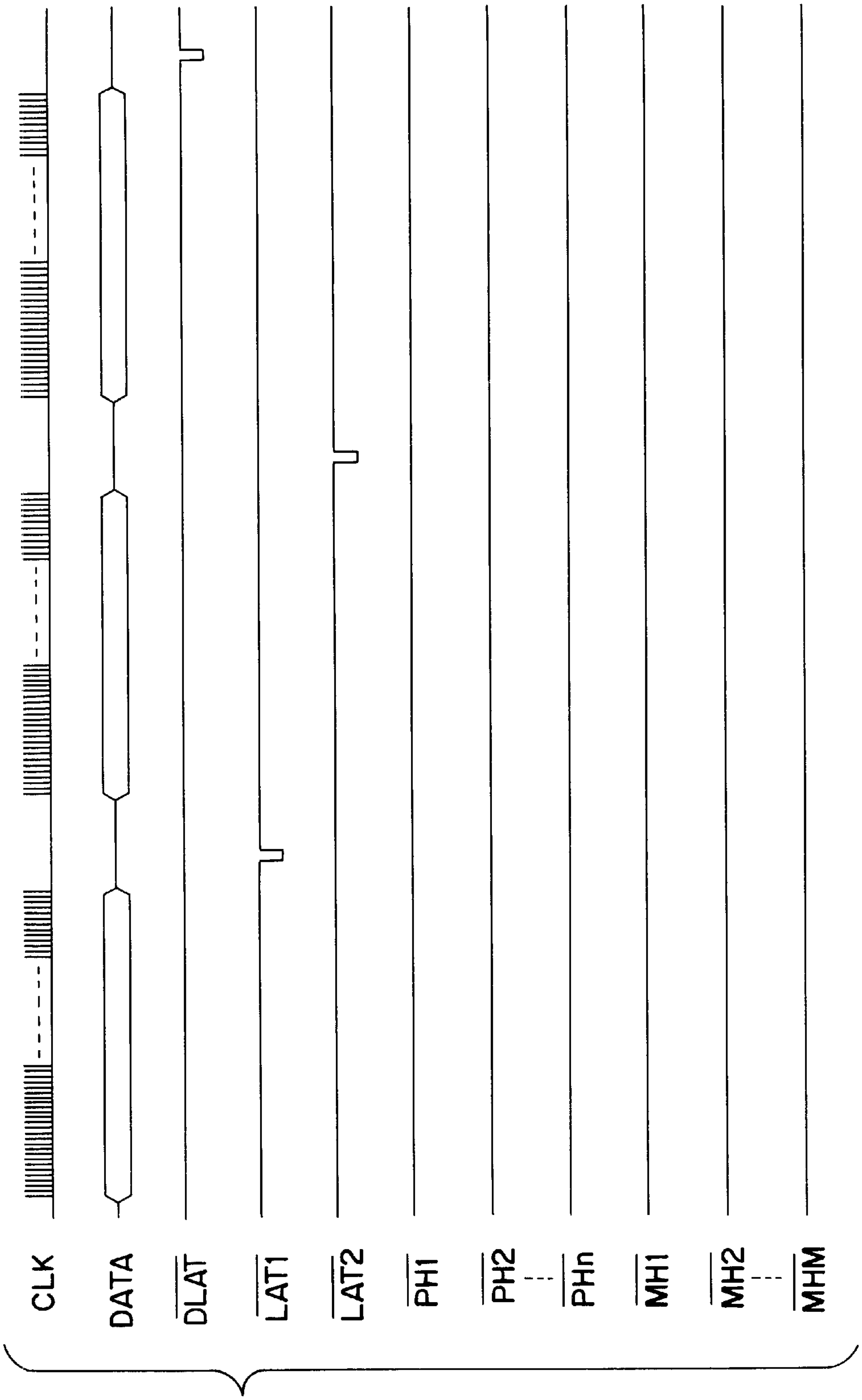
FIG. 18 is a timing chart of driving when the initial and arbitrary correction data are transferred to the recording head in accordance with the present embodiment.

FIG. 18 is a timing chart when the initial density unevenness correction data are transferred to the recording head.

The initial density unevenness correction data may be transferred to the recording head before recording is started or when recording is in standby. Here, in accordance with the present invention, it is arranged that the shift register that receives image data and the shift register that receives the initial density unevenness correction data are used shareably. Consequently, when the image data are transferred to the shift register in the recording operation, the initial density unevenness correction data cannot be transferred during such period.

Now, if terminals for applying energies of 4 stages (PH1 to n where n=4) are prepared as shown in FIG. 18, the setting of the initial density unevenness correction data is completed by outputting the latch signals (LAT 1, 2) one after another in order to select the applicable energies of four stages per recording element. Here, during this period, it is prohibited to input any one of driving pulse widths that may be required for recording. The latch signal DLAT outputted thereafter is used to print image data. The recording is executed by applying the driving pulse width inputted at the next timing by.

Figure 20:
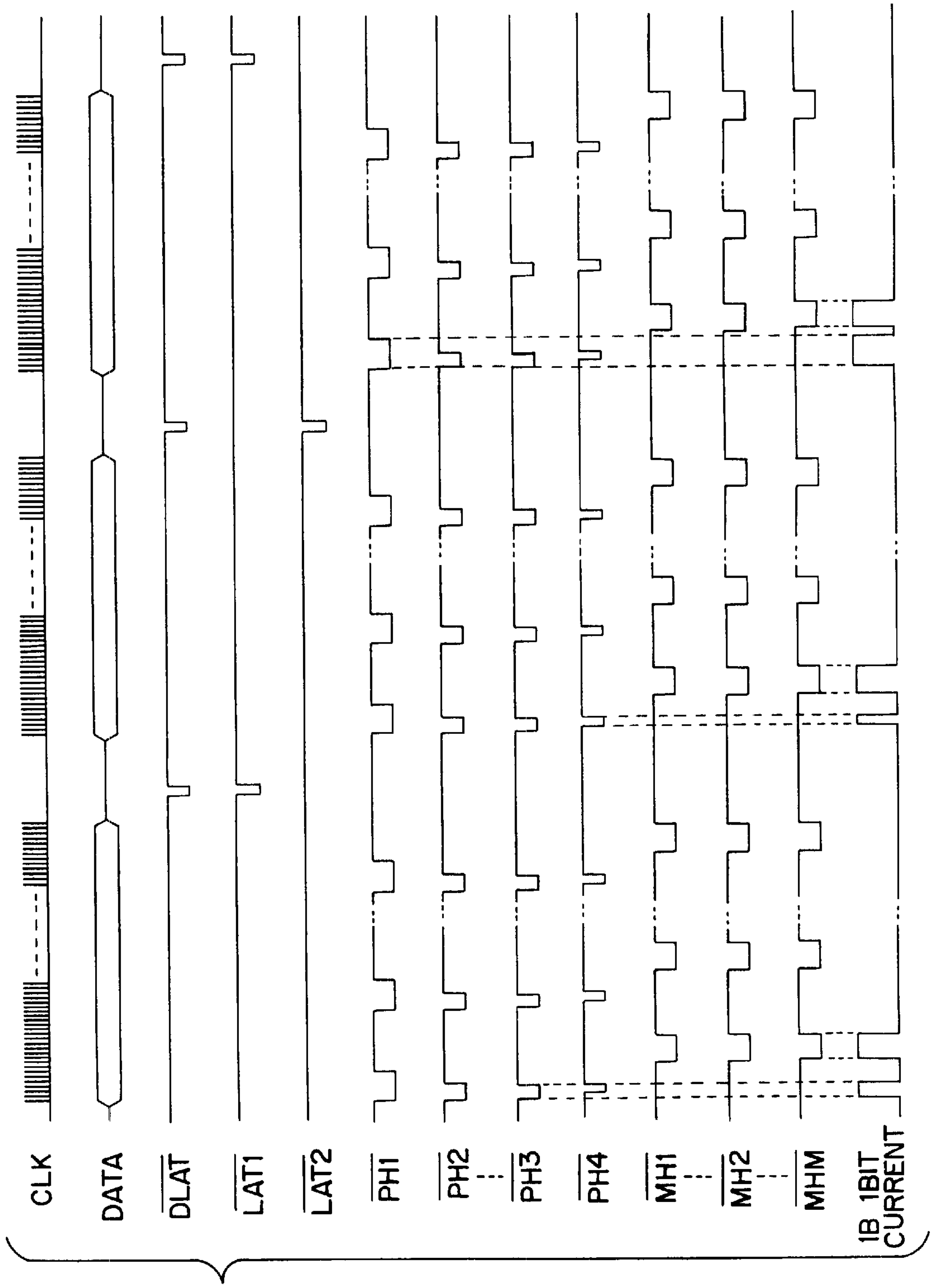
FIG. 20 is a timing chart of driving when recording is performed in accordance with the correction data which are referenced to the image data for the recording head in accordance with the present embodiment.

It may be possible to set the n-staged applicable energies of each of the recording elements per line by the utilization of the history of image data. For example, if the recording head is such that the present invention is applicable to and that has the circuit structure as shown in FIG. 14, the historic control is possible with reference to lines from the m-th line before ($m=\log_2 n$) by arranging the driving timing as shown in FIG. 20. Then, by making the weighting of the applicable energies of n stages smaller for the driving elements driven continuously, it becomes attainable to automatically make the applied energy smaller on the next stage for the recording element that has been driven up to the m-th line without a complicated control or the provision of any reference tables. FIG. 20 is a view which shows the example of a case of m=2, that is, a case where the applicable energies of n=4 stages can be prepared. FIG. 18 is a view which shows the method of data transfer when the initial correction data or arbitrary correction data are produced by a host computer. In the case of this driving, the correction data are held in the latch circuit of the recording head as the initial data.

Figure 19:
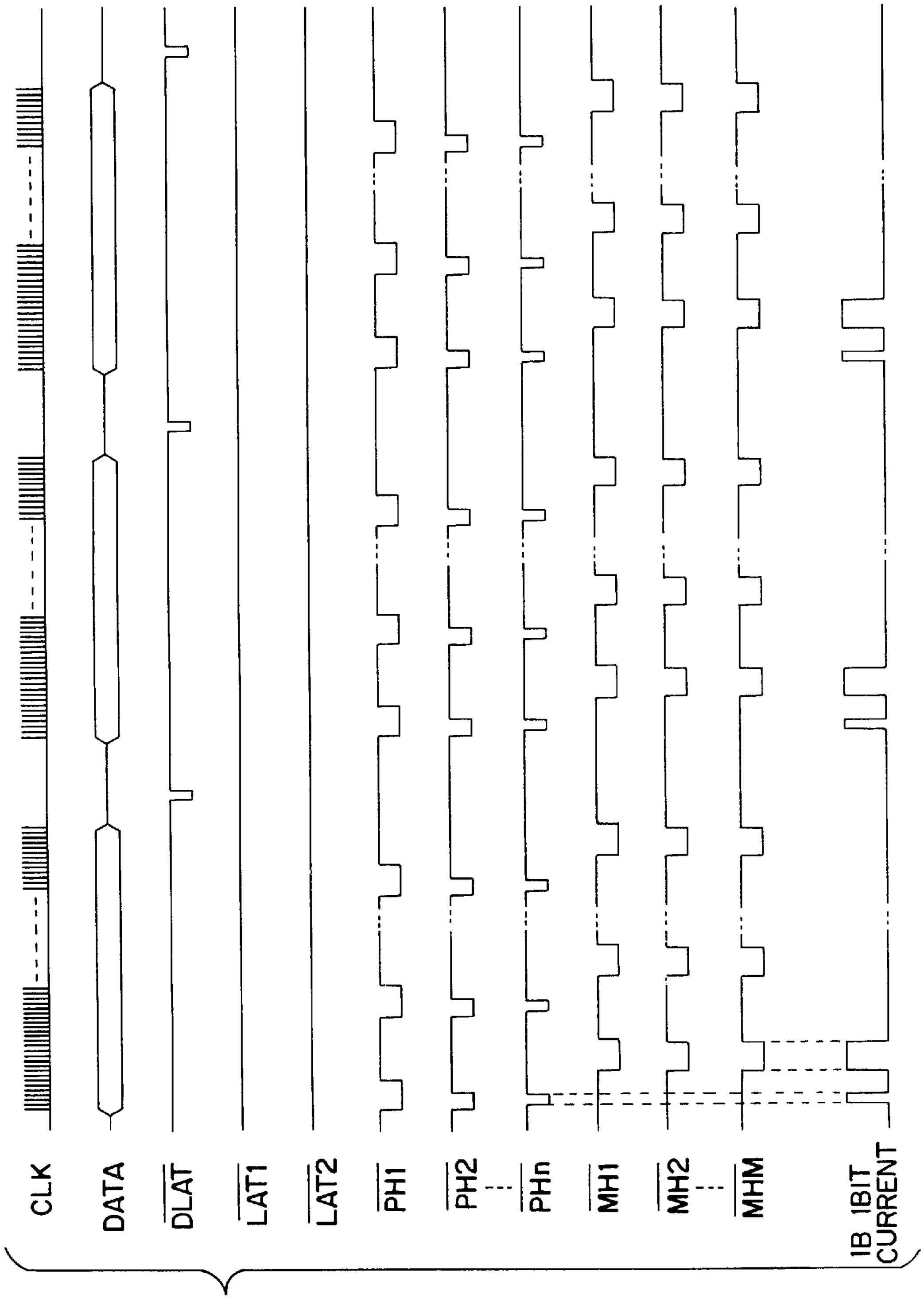
FIG. 19 is a timing chart of driving when the initial and arbitrary correction data are transferred to the recording head in accordance with the present embodiment.

FIG. 19 is a view which shows the driving to record the image data per line after completion of the transfer of the correction data. The recording elements are driven by either one of PH1 to n (in this case, n=4) of the applicable energies of n stages selected for each predetermined unit.

Here, the MH1 to MHM (the M=the number of heater boards 1000 which is obtained by dividing the number of recording elements to cover the entire width by the number of recording elements provided for the heater board 1000)

have the pulse width which is selectively set by means of the heat generating element resistance monitor 314 in consideration of the variation for each heater board. They drive the group of the recording elements for each heater board.

Here, for example, it is assumed that the "ALL High" is selected sequentially for the initial density unevenness correction data from the first.

In this case, the terminals for the n-th rank energy are selected as the initial density unevenness correction data for all the recording elements. (Here, in case of "ALL Low", the terminals for the first rank energy is selected).

On the lowest timing chart shown in FIG. 19, the state of the energy to be applied to the first nozzle in the first block is indicated.

At this juncture, the energy is applied by executing logical OR between the driving pulse width of the main heat signal MH1 in the first block and the energy signal PHn of the n-th rank.

Now, for FIG. 20, it is indicated that when the density unevenness of the recording head, which has been corrected in accordance with the initial density unevenness correction data of the recording head, changes as the time elapses, the method of correction for the recording head, which is provided with the same circuit structures, may be modified by updating the data held in the latch circuit. It is possible to attain this driving by sequentially latching per m line the latch signals which are inputted into the latch 102 for holding the selecting data 101 that selects the energy of the n stages to be applied to the recording head. The larger the number of the circuits frequency of each of the recording elements between m lines, the smaller is the energy of the n stages to be applied on the next line. Therefore, this method is effective in improving the head durability or reducing the heat accumulation factors. Selection of the mode in which the printing data are caused to be correlated with the applied energy at this n stage, diffusion of the densities, or selection of the initial correction data is executed via interface by setting in the host computer. It may also be changed by updating the user's print setting.

Here, the image data per line are defined in FIG. 20 as:

1 "All High"

2 "All Low"

3 "All Low"

in that order. The applicable energy of the first element on the first block is indicated on the assumption that image data before the data 1 is defined as "All High", image data further one before the data 1 is defined as "ALL Low".

In this case, the latch signal terminals LAT 1 and LAT 2, for setting the correction data, perform their outputs alternately. Therefore, the first driving pulse width in FIG. 20 is applied by executing logical OR between the driving pulse width of the main heat signal MH1 of the first block and the energy signal PH3 of the third rank. For the next line, since the image data on the last two lines have been "ALL High", the energy of the n-th (n=4) rank is selected and the energy of the first rank is selected for the next line.

Figure 3:
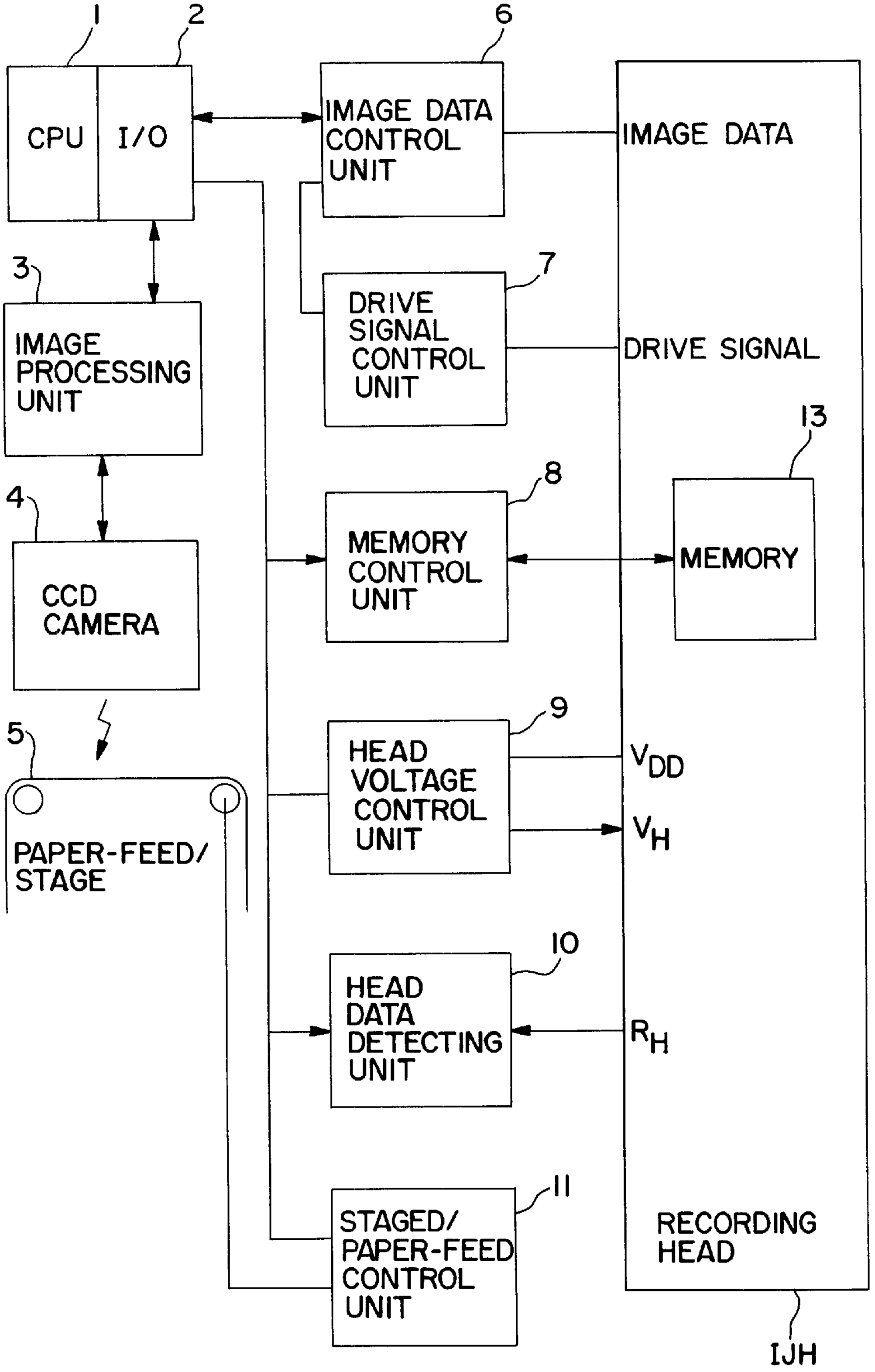
FIG. 3 is a block diagram which shows the structure of a recording head correction apparatus in accordance with the present embodiment.

FIG. 3 is a block diagram which shows the structure of the recording head correction apparatus which performs the correction of initial density unevenness of the recording head of the present embodiment. In FIG. 3, a reference number 1 designates a CPU that manages all the control units of the recording head correction apparatus; 2, an I/O interface of all the control units; and 3, an image processing unit. The image processing unit 3 converts dot diameters and density unevenness into pixel values in accordance with printed dot pattern read by the CCD camera 4 from a recording medium on the paper-feed stage 5. When the image processing unit 3 transmits all the dot data to the CPU 1 corresponding to all the recording elements of the recording head IJH, the CPU 1 executes its arithmetic process on them, and transfers the density correction data to a driving signal control unit 7 in accordance with the driving signal of the recording head IJH. At the same time, the CPU develops the density correction data on a memory control unit 8.

The image data control unit 6 transmits the dot pattern to the recording head IJH for the execution of its recording. Not only when the usual printing is performed, but also, when the density correction data are established, this control unit transmits the density correction driving signals while transmitting synchronized signals to the driving signal control unit 7. The CPU 1 manages a voltage control unit 9 that controls the driving voltages applied to the recording head, and also, manages a stage/paper-feed control unit 11 that controls the operation of the paper-feed stage 5, hence controlling the setting of an appropriate driving voltage, the movement of stage for the apparatus, the feeding of the printing paper sheet, or the like. Further, a head data detection unit 10 is an important part that feeds back the properties of each of the substrates (printing devices) 1000 (See FIG. 10) for effectuating the density corrections.

For example, as for the recording head IJH in which a plurality of substrates 1000, each provided with 64 or 128 recording elements thereon, are arranged in alignment, it is impossible to determine what part of the silicon wafer each of the substrates is cut from, and the substrates may be different properties.

Even in this case, in order to record the entire recording head in uniform density, in the interior of each substrate 1000, a rank detection device RH is provided with the same sheet resistance as the corresponding recording element. Beside this arrangement, there may be some case where a semiconductor device or the like is provided so as to monitor the temperature changes for each substrate 1000. The head data detection unit 10 monitors each of these devices. Then, when the head data detection unit 10 transmits to the CPU 1 the data obtained by monitoring these devices, the CPU 1 creates the correction data that may correct data for driving each of the substrates 1000 so that each of them can record in the uniform density, respectively.

When the aforesaid correction data are reflected on each of the control units of the recording head correction apparatus, the recording operation is executed by the recording head IJH in the status thus controlled. The recording head correction apparatus again executes the image process by use of the CCD camera 4 and the image processing unit 3, and writes the final correction data in the memory 13 (EEPROM or the like) at the stage where the current printing becomes satisfactorily executable by the recording head in accordance with its predetermined regulations.

Figure 4:
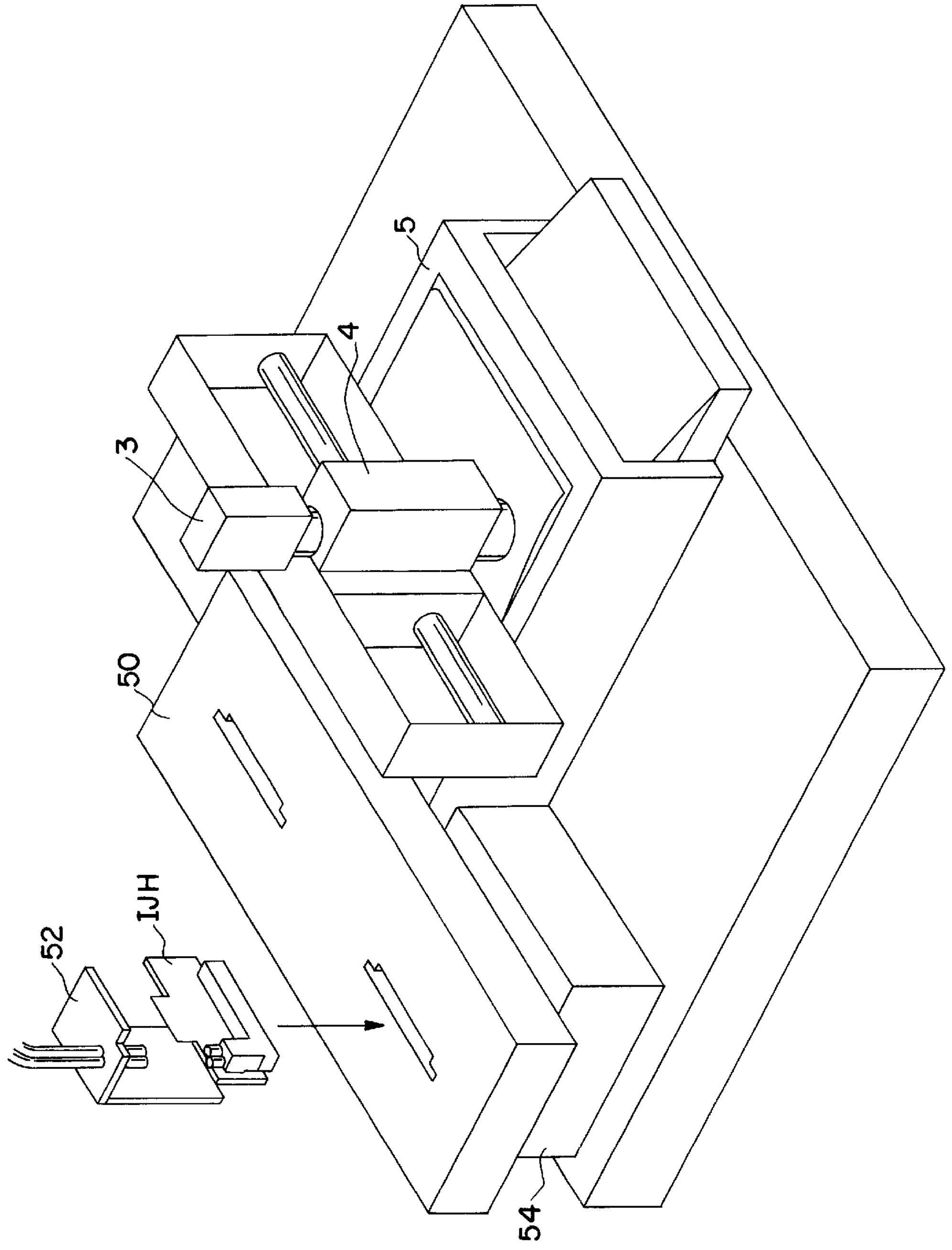
FIG. 4 is a perspective view which shows the structure of the recording head correction apparatus.
Figure 5:
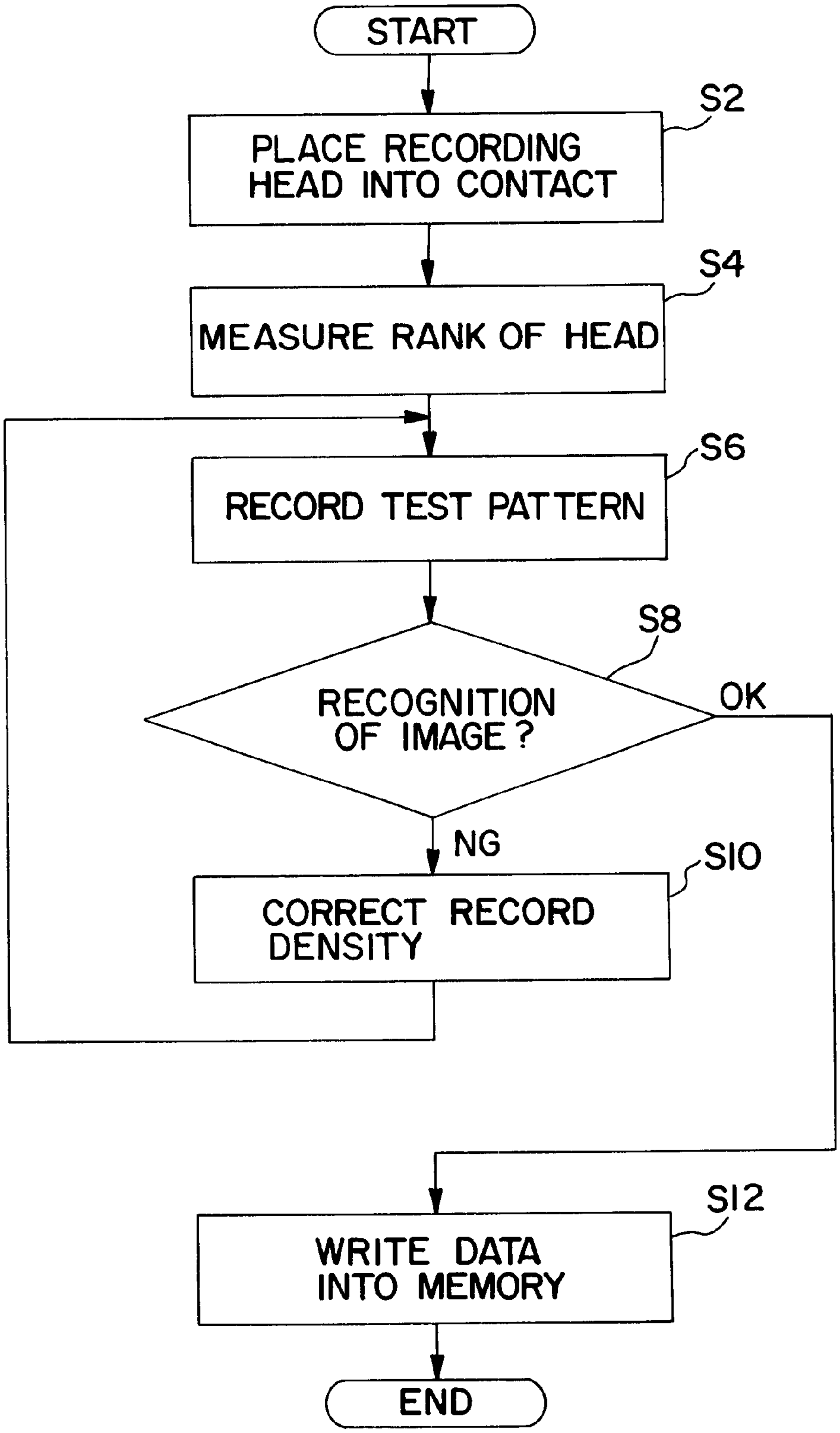
FIG. 5 is a flowchart which shows the operation of the recording head correction apparatus.

FIG. 4 and FIG. 5 are perspective views which show the structure of the recording head correction apparatus and a flowchart which shows the operation thereof, respectively. Now, hereunder, with reference to FIG. 4 and FIG. 5, the operation thereof will be described. In accordance with the present embodiment, the description will be made on the case (1) where data on the density unevenness are created per four dots, and the correction is made per unit of four dots, and the case (2) where data on the density unevenness are created per dot, and the correction is made per unit of one dot.

(1) The Correction Process of 4-Dot Unit

The recording head IJH is mounted on a fixing base 50. Then, the CPU 1 enables the fixing base 50 to operate to fix the recording head IJH on the fixing base 50 so that the recording head IJH may perform the recording operation in the normal position. At the same time, electric contact is made with the recording head IJH, and an ink supply device 52 is connected with the recording head IJH simultaneously (step S2).

Subsequently, a sheet resistance value of the substrate 1000 is monitored (step S4) in order to measure a rank of the recording head IJH.

In a case of an elongated (full-line) recording head unit, the sheet resistance value is monitored per block (for each of the substrates when the structure is arranged by arranged a plurality of substrates) so as to determine a driving power individually to execute test pattern recording (step S6). As the pre-process of the execution of the test pattern, the preliminary recording (aging) is performed until the operation of the recording head IJH is stabilized so that the recording head IJH can record stably. The aging is executed on a tray for aging use arranged in parallel with a heat recovery process unit 54. Then, the recovery process (ink suction, orifice face cleaning, and the like) is executed to carry out the normal recording of the test pattern. When the test pattern recording is executed, the result of recorded pattern is carried up to the positions of the CCD camera 4 and the image processing unit 3 to give the image processing thereon and compare with the recording evaluation parameters.

Now, the specific description will be made on the production procedures of the density unevenness data.

Figure 6:
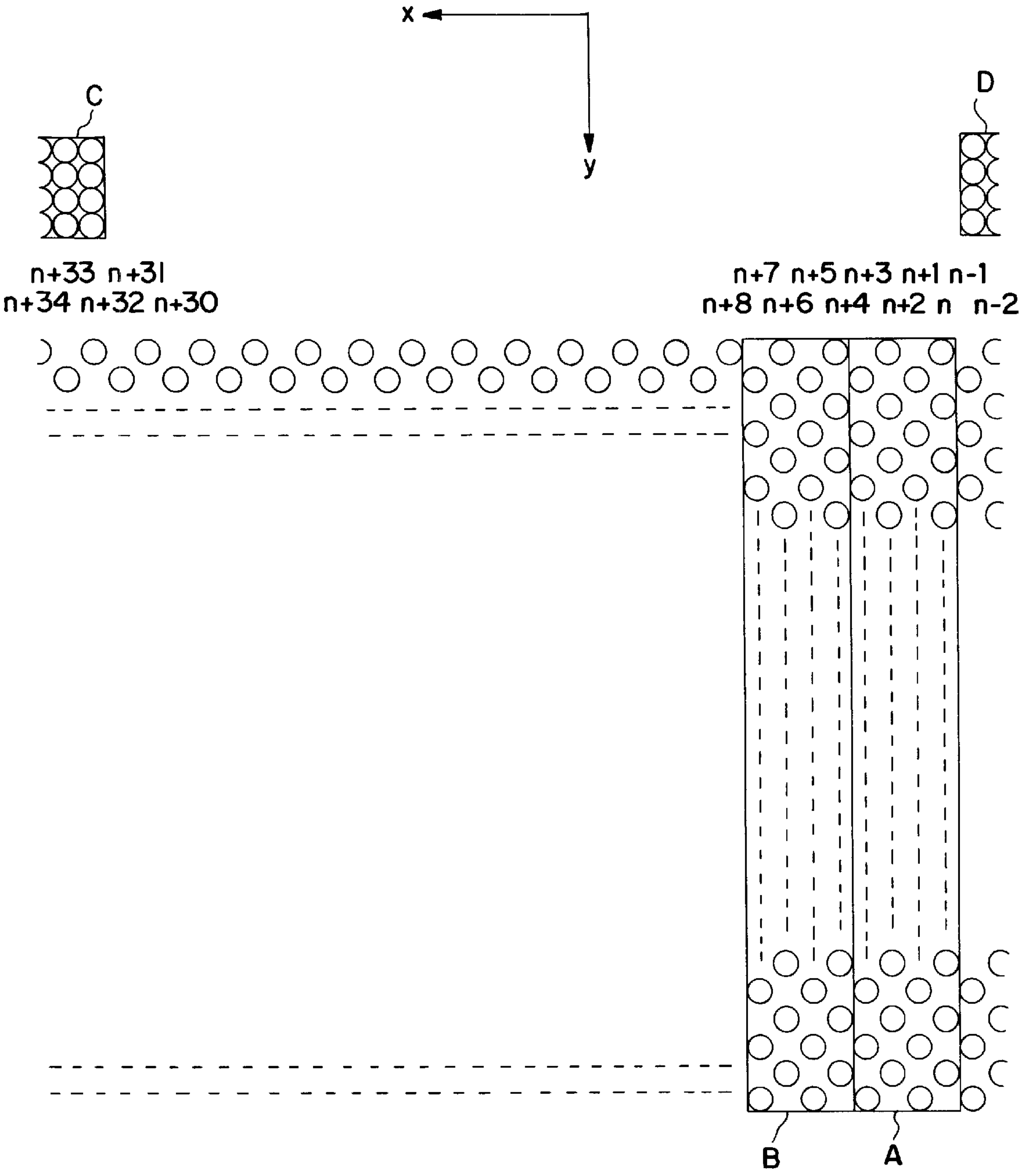
FIG. 6 is a view which shows the test pattern for density correction used for the present embodiment.

FIG. 6 is a view which shows one example of the image pattern to be read by the CCD camera or the like. The example shown in FIG. 6 is such that a 50% duty dot pattern is formed, and the dot pattern corresponding to the 32 dots×32 dots portion is allocated to the screen area of the CCD camera. In FIG. 6, reference marks A and B designate the 4 dots×32 dots region, respectively. Then, this is defined as one event in accordance with the present embodiment. On the other hand, reference marks C and D in FIG. 6 designate the respective markers which are arranged for the image recognition of the dot pattern each having 32 dots×32 dots.

Here, given the reading initiation dots as n, the area of one event is formed (at A in FIG. 6) by one set of dots up to n+3 in the direction of x-axis in FIG. 6 (in the arrangement direction of the printing elements), and 32-bit portion in the direction of y axis (in the carrying direction of the recording medium). On the image memory (not shown), eight of the same areas are prepared, and then, the binarization process is executed for each of the areas in accordance with the number of "black" or "white" pixels and with a predetermined threshold value as well. In this respect, the optimal value, which has been obtained experimentally, is adopted for the threshold value. With such binarization process, the density unevenness data are obtained per four dots accordingly.

Also, it is effective to define the absolute density (the sum of black pixels) per area as the density unevenness data.

Further, it is possible to scan the 50% duty dot pattern shown in FIG. 6 by an image scanner to obtain images each having an area corresponding to 100 dots per nozzle of a printing element, and process the images to use as the density unevenness data.

In accordance with this method, it is possible to obtain a number of events more than 100 dots (100 times of recordings) per nozzle, thus averaging the fine fluctuations of dot diameters in the direction y. Usually, when the density unevenness is observed by eye-sight, the fluctuations of the dot diameters are not often recognized in the direction y. However, if the number of events is smaller, the resultant density unevenness is not the same that is usually recognizable by the eye-sight, and the data thus obtained is no longer adoptable as an appropriate data on the density unevenness, because such data cannot be regarded as meaningful as the statistical data at least to the extent that its unevenness is recognizable by eye-sight. Now, with respect to the direction x, if only the data on the density unevenness can be obtained per dot unit, it is possible to adopt them as the appropriate data on the density unevenness only with a further process of grouping several of them for the data formation. Then, it may be possible to arrange an external device in order to set the dot unit in which such grouping is made or it may be possible to average the data on the density unevenness per four-dot unit in the direction x for the preparation of the correction data for every four-dot unit as described earlier.

The density unevenness data thus obtained can be processed in a shorter period of time without making the structure complicated irrespective of a recording head manufacturing apparatus or a printing apparatus.

Also, the density unevenness data thus obtained per four dots makes it possible to provide the same data for every four nozzles of a recording head.

Now, with the data on the density unevenness thus obtained, each of the correction procedures is determined for the next elements in accordance with such data. For example, if the driving powers for the recording elements are determined by the pulse widths, the data on the driving pulse widths are selected to provide them for the driving integrated circuits of the recording head. Although described later in detail, if the pulse width control circuit of the driving integrated circuits make selection from among several pulse widths, the MAX and MIN of pulse widths to be selected are determined in accordance with the density unevenness data. Then, a pulse width is set depending on the allowable resolution within a range thus determined. Then, the pulse widths are set so as to correct the recording density of each of the elements in accordance with the image processing data. In this manner, it is made possible to implement the uniformity of the recording densities of the recording head unit with each of the recording elements which are prepared to operate accordingly. The above processes are repeated until the data are obtained appropriately. Then, the data thus obtained are stored in the memory 13. These processes are executed in the step S8 to step S12.

Here, in accordance with the present embodiment, it is possible to significantly reduce the test frequencies needed for obtaining the appropriate data as compared with the conventional art described in conjunction with the disclosure made in the specification of Japanese Patent Application Laid-Open No. 6-34558.

(2) The Correction Process Per One-Dot

The data on the density unevenness described above are created together per four dots in the arrangement direction of the printing devices so as to produce the density unevenness which is made meaningful from the viewpoint of the visual property of human being. However, if an apparatus reads recorded images on a recording medium, such as a color filter, or if an apparatus discriminates one image from another unlike the recorded images on a recording sheet which is visually recognized by human being, the density unevenness per dot may exert a great influence on the image quality directly.

In this case, it is necessary to correct the density unevenness of an image for each dot. The description given below relates to a process for correcting the density unevenness of an image for each dot by using as a correction parameter a pulse width of the pre-heat pulse used for double pulse width control of a recording head on the premise that the structure of the recording head is of the type that the pre-heat pulse width of n kinds is selectable for each of the recording elements arranged to cover one line.

This process corresponds to the step S4 to the step S10 of the flowchart shown in FIG. 5.

At first, in step S4, the resistance value of each of the units (substrates 1000) of the recording head is monitored as described earlier, and the energizing period of recording current (the sum of the pre-heat pulse width and the main pulse width), which corresponds to each of the resistance values, is calculated in accordance with the fluctuation in the resistance values of the respective M units as arranged. Fundamentally, this calculation is performed by means of the simulation of each of the recording elements. Since the recording head is formed by the M units, the mean value of M energizing periods of recording current. A value obtained by multiplying the mean value thus obtained by $\alpha$ times ($0 \leq \alpha < 1$) becomes the pre-heat pulse width for obtaining reference OD value which will be described later. The pre-heat pulse width thus obtained is shared by each of the units for use.

FIG. 7 is a view which shows the energizing period of recording current per unit of the recording head which reflects the properties of the recording head obtained in the manner as described above, the pre-heat width shared by each of the units, and the double pulse to be applied to each of them. In this respect, the value $\alpha$ is the one obtained experimentally by means of the double pulse control of the recording head.

Then, in step 6, using a recording head to be corrected, the recording head correction corrected, records on a recording medium (1) the reference pattern shown in FIG. 7 by the application of double pulse, and (b) the test pattern for use of the density correction. With the control of the double pulse width given to the recording head, these patterns are recorded plural times (n), while changing the pre-heat widths, with approximately 100 dots as a unit in the carrying direction of the recording medium (direction y) in order to average the fine fluctuations of each of the nozzles of the recording head.

In this respect, the aforesaid standard and test patterns are recorded after the condition of the recording head to be corrected becomes stable.

Then, in step S8, the reference and test patterns thus recorded are read by the CCD camera 4 for image processing. After that, these are converted into the OD values.

FIG. 8 is a view which shows the OD values in the form of a table. The OD values are obtained after the thus recorded test patterns have been read and processed regarding each of the recording elements, and they are dependent upon the applied pre-heat widths. FIG. 8 represents a case where the recording is executed 10 times (n=10), and the OD values are indicated for each of the recording elements with the pre-heat width being increased by 0.125 μs from 0.875 μs to 2.0 μs. From this table, it is understandable that the OD values fluctuate per recording element even when a specific pre-heat pulse width is applied.

In accordance with the present embodiment, the optimal value is selected per recording device as a correction parameter in order to eliminate the density unevenness from the n pre-heat pulse widths. This optimal value is equal to a certain reference OD value (which will be described later) or close to the reference value. For example, given the standard OD value as 0.43, the pre-heat pulse width is selected as the correction parameter for each of the recording elements as each of those values marked with asterisk in FIG. 8. With the correction parameter thus selected, the density is corrected, and the OD value of each of the recording elements becomes equal substantially. As a result, the density unevenness is eliminated. On the lowest step in FIG. 8, there are indicated each of the numbers given to the correction parameter selected for each of the recording elements.

Figure 9:
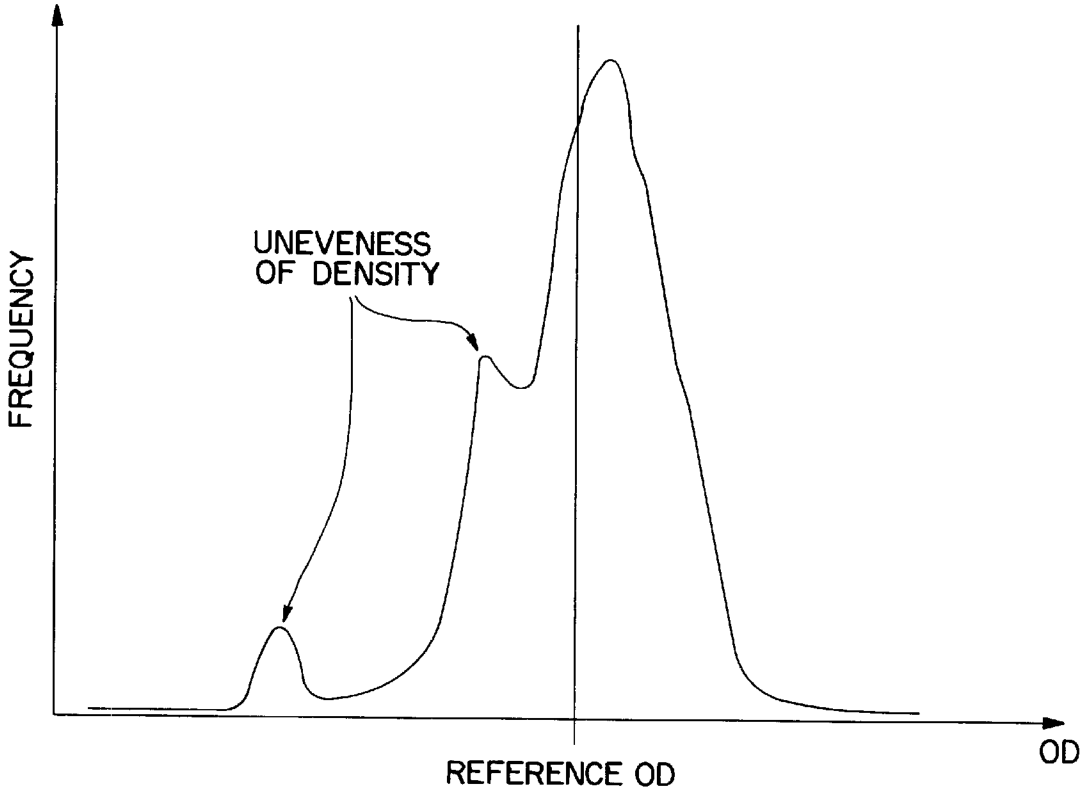
FIG. 9 is a view which shows the histogram of the OD values obtainable from the recorded standard pattern.

Meanwhile, on the basis of the OD values obtained from the recorded reference pattern, its histogram is acquired. FIG. 9 shows one example of the histogram of the OD values obtained from the reference pattern. In accordance with the histogram obtained by means of a statistical process of the kind, the reference OD value is acquired. In other words, there may be selected as the reference OD value one of the OD values which correspond to the maximum value, the minimum value, the central value, the value of maximum frequency, the mean value, the dispersion value of the maximum frequency value, or the like of the histogram. Thus, the reference OD value is selected in accordance with the histogram of the OD values obtained from the recorded reference pattern which has reflected the properties of the recording head. Here, it may be possible to add the correction value (+β), which has reflected the variation in the production lots of recording heads, to the mean value described above. In either case, the statistical process is given to the recorded objects by use of the reference pattern, hence making one of the OD values thus obtained a criterion. Then, the value defined as this criterion always reflects the properties (the fluctuations in resistance values of each of the units) of the recording head which is the target of correction.

Now, FIG. 8 shows the case where the recording frequency of the test pattern is n=10. Naturally, however, the larger the n value, the more becomes the correction circuit complicated for the recording head. Therefore, in order to attain the reduction of the density unevenness and the provision of recording heads at lower costs, it is important to minimize the n value. In general, the density unevenness is visually recognized when the difference in the OD values of adjacent dots is larger. This difference is often the deviation between the regular distribution of the OD values similar to the histogram of each of the dots obtained from the reference pattern, and the OD value which is protuberant among them. This is the result which has been confirmed experimentally or in accordance with the past experiences.

Therefore, if parameters are prepared so as to level the OD values on the protuberant portion with the reference OD value with respect to the histogram of the OD values of the reference pattern as shown in FIG. 9, it becomes possible to correct the density unevenness sufficiently even when the n value is smaller, such as approximately n=4. Here, it is of course possible to make the density unevenness still smaller with the small n value for the recording head having the smaller distribution of the protuberant potions in the histogram of the OD values of the reference pattern, that is, the head whose density unevenness is small fundamentally.

As described above, for the correction of the density unevenness of the recording head, by setting a host computer of by a user's change of print setting, there is appropriately selected the initial correction data prepared by use of the correction apparatus for making the aforesaid density correction, the arbitrary correction data on the density diffusion or the like effectuated by the generation of random numbers, or the mode in which the energy of n stages applied for each recording element is correlated with the printing data from m-line before ($m=\log_2 n$) to the line immediately before, hence implementing the longer life of the recording head, while attaining the provision of images in higher quality, without giving large load to a specific recording element.

In this respect, the description has been made on the substrates for which the pre-heat pulses are selected. However, the present invention is not necessarily limited to such selection. For example, it may be possible to perform the density correction by changing the main pulse widths by use of a counter or the like.

Further, it is of course possible to perform the density correction by the application of the present invention if the substrate is capable of controlling the driving power for each of the recording elements. Moreover, the invention makes it possible to perform the density correction in the same way even if the structure of the recording head is different.

Here, also, the description has been made on the control of the recording operation of the recording head, which is executable by means of a controller on the recording apparatus side in accordance with the correction data stored in the memory in the recording head. However, it may be possible to install such controller in the recording head.

Furthermore, the description has been made by exemplifying the full-line type printer therefor. This invention, however, is not limited only to the use of this type of printer. For example, the invention is applicable to the structure of a serial type printer where a number of nozzles are arranged in the carrying direction of a recording sheet, and recording is performed by moving the recording head mounted on a carriage. Moreover, the invention is applicable irrespective of the different kinds of recording head (such as ink jet head, thermal head, LED print head, or the like).

Also, it is of course possible to obtain the same effect irrespective of the different methods for setting driving power for the respective recording elements of the recording head.

Particularly among the printers using the ink jet recording methods, the present invention has been described with respect to the one which is provided with means (electrothermal transducing devices, laser beam, or the like) for generating thermal energy as the energy to be utilized for discharge ink, because with the printer of such type, it is possible to attain the performance of recording in higher density and in higher precision as well.

The basic principle disclosed in U.S. Pat. Nos. 4,723,129 and 4,740,796 is preferably used as a representative configuration or principle for achieving this method. This method is applicable to both on-demand and continuous types, but is particularly effectively used for the on-demand type; in this case, at least one drive signal that corresponds to recorded information and that increases the temperature rapidly above the film boiling point is applied to an electrothermal energy converter arranged so as to correspond to a sheet or a channel in which a liquid (ink) is retained, thereby generating thermal energy in the electrothermal energy converter to cause film boiling on the heated surface of the recording head, so that a bubble can be generated in the liquid (ink) so as to correspond to the drive signal on a one-to-one correspondence. The bubble is grown or contracted to eject the liquid (ink) through the ejection opening to form at least one droplet. If this drive signal is shaped like a pulse, the bubble is immediately appropriately grown or contracted to preferably achieve the particularly responsive ejection of the liquid (ink). Suitable pulse-shaped drive signals are described in U.S. Pat. Nos. 4,463,359 and 4,345,262. More excellent recording can be accomplished using the conditions for the temperature increase rate of the heated surface described in U.S. Pat. No. 4,313,124.

The recording head may be configured by combining an ejection port, a channel, and an electrothermal energy converter (a linear liquid channel or a perpendicular liquid channel) as described in the above specifications, but this invention may also be configured as in U.S. Pat. Nos. 4,558,333 and 4,459,600 wherein the heated portion is located in a bent region. Besides, this invention is also effective when configured as in Japanese Patent Application Laid-Open No. 59-123670 disclosing the configuration in which a common slit is used as an ejection section for a plurality of electrothermal energy converter or as in Japanese Patent Application Laid-Open No. 59-138461 in which an opening absorbing the pressure wave of thermal energy corresponds to the ejection section. That is, whatever the form of the recording head is, this invention enables recording to be achieved reliably and efficiently.

Moreover, this invention can be effectively applied to a full-line type recording head having a length corresponding to the maximum width of a storage medium on which the recording apparatus records data. Such a recording head may be composed of a plurality of recording heads to meet this length or of a single recording head that is integrally formed.

Besides, this invention is effectively applied to the serial type such as that described above, a recording head fixed to the apparatus body, a replaceable chip type that is installed in the apparatus body to electrically connect thereto or to receive ink therefrom, or a cartridge type in which an ink tank is integrally provided in the recording head.

An ejection recovery means for the recording head or an extra supplementary means is preferably added to the present recording apparatus to further stabilize the effects of this invention. Specifically, such means include a capping, cleaning, pressurizing, or sucking means for the recording head, an extra heating means for generating heat using an electrothermal energy converter or another heating element or their combination, and an extra ejection means for executing ejection used for a purpose different from recording.

The recording mode of the recording apparatus may not only be one for main colors such as black but may also include the integral configuration of a single recording head or a combination of a plurality of heads. This invention, however, is very effective on an apparatus including at least one of two recording modes for multiple different colors and a full color obtained by mixing colors.

In addition, although, in the above embodiment, the ink has been described as a liquid, it may be solidified at the room temperature or lower or may be softened or liquefied at the room temperature. Alternatively, since the ink jet method generally adjusts and controls the temperature of the ink between 30° C. and 70° C. to maintain the viscosity of the ink within a stable ejection range, the ink may become liquid when a recording signal is applied.

In addition, to actively prevent thermal energy from increasing the temperature or evaporating the ink by using this energy to transform the ink from a solid state to a liquid state, the ink may be solidified when left and may be liquefied when heated. Thus, this invention is applicable to ink that is not liquefied unless it is subjected to thermal energy, such as one that is liquefied and ejected as a liquefied ink when thermal energy is applied according to a recording signal or that starts to be solidified as soon as it reaches the storage medium. Such ink may be retained as a liquid or a solid in recessed portions or through-holes in a porous sheet in such a way as to be opposed to the electrothermal energy converter, as described in Japanese Patent Application Laid-Open No. 54-56847 or No. 60-71260. According to this invention, the film boiling method is most effective on each of the above inks.

Besides, the present ink jet recording apparatus may be used as an image output terminal for data processing equipment such as computers, or a copier combined with a reader, or facsimile terminal equipment having a transmission and reception function.

In this respect, the present invention may be applicable to a system composed of a plurality of equipments or an apparatus composed of a single equipment. Also, it is of course possible to apply the present invention to a system or an apparatus which becomes operative by providing a program therefor.

As described above, in accordance with the present invention, there is provided a method for correcting a recording head having plural recording elements and memory means capable of storing data, comprises the steps of recording preliminarily recording patterns on a recording medium for use of the recording head in accordance with plural kinds of signals applied thereto; of selecting one of the plural kinds of signals from the density distributions of image patterns recorded on the recording medium so that the density of the recorded image may be equal or substantially equal to the reference density for each predetermined unit of the recording elements; of preparing data for selecting one of the plural kinds of signals for each predetermined unit of the recording elements as correction data; of storing the correction data in the memory means of the recording head as initial correction data; of selecting one of the initial correction data and the correction data output from a correction data controlling unit for generating arbitrary correction data for each predetermined unit; and of transmitting data based on the selected data to the recording head. With the adoption of this method, it is not only possible to attain a high quality printing without density unevenness, but also, to make the life of the recording head longer effectively.

Also, in accordance with the present invention, it is possible to prepare in the recording head the correction data congruous with the distribution status of the image data with respect to the recording elements for a predetermined unit by creating the correction data for the recording elements for a predetermined unit with reference to the image data corresponding to the recording devices of the one line, from the m ($m=\log_2 n$) lines before to the line immediately before, and then, by appropriately selecting either one of the initial correction data and the correction data output by the correction data controlling unit for generating arbitrary correction data. With the adoption of this method, it is not only possible to attain a high quality printing without density unevenness, but also, to make the life of the recording head longer effectively. The provision of these effects can be attained without complicating control signals of the recording apparatus.

What is claimed is:

1. A method for correcting a recording head provided with a plurality of recording elements and memory means capable of storing data, comprising the steps of:

recording preliminarily recording patterns on a recording medium by use of said recording head in accordance with plural kinds of signals applied thereto;

selecting one of said plural kinds of signals for a predetermined unit of said recording elements from the density distributions to the image pattern recorded on said recording medium so as to make the density of the recorded image equal to a reference density or an approximate value thereof;

preparing as correction data, data for selecting one of said plural kinds of signals for a predetermined unit of said recording elements, and storing said correction data on said memory means of said recording head as initial correction data; and selecting either one of said initial correction and the correction data output by a correction data controlling unit for generating arbitrary correction data for a predetermined unit of said recording elements, and transmitting data to said recording head in accordance with said selected data.

2. A method for correcting a recording head according to claim 1, further comprising the step of transmitting plural kinds of different record signals for a predetermine unit of said recording elements and causing one of said plural kinds of different record signals for each predetermined unit of said recording elements in unit of one line of printing by said recording head, to correspond to said selected data.

3. A method for correcting a recording head according to claim 1, wherein said correction data controlling unit generates arbitrary correction data with reference to the tendency of said initial correction data.

4. A method for correcting a recording head according to claim 1, wherein said correction data controlling unit is provided with a plurality of correction tables, and generates arbitrary data by the tendency of said initial correction data and said plurality of correction tables as developed.

5. A method for correcting a recording head according to claim 1, wherein the correction table of said correction data controlling unit contains means for generating random numbers.

6. A method for correcting a recording head provided with a plurality of recording elements and memory means capable of storing data, comprising the steps of:

recording preliminarily recording patterns on a recording medium by use of said recording head in accordance with n kinds of signals applied thereto;

selecting one of said n kinds of signals for a predetermined unit of said recording elements from the density distributions of the image pattern recorded on said recording medium so as to make the density of the recorded image equal to a reference density or an approximate value thereof;

preparing as correction data data for selecting one of said plural kinds of signals for a predetermined unit of said recording elements; and storing said correction data on said memory means of said recording head as initial correction data; and generating the correction data for a predetermined unit of said recording elements with reference to the image data corresponding to one line of the recording elements from the m-th line ($m=\log_2 n$) to the line immediately before; and selecting appropriately either one of said initial correction data and the correction data output by a correction data controlling unit for generating arbitrary correction data.

7. A method for correcting a recording head according to claim 1 or claim 6, wherein said predetermined unit corresponds to one recording element.

8. A method for correcting a recording head according to claim 1 or claim 6, wherein said predetermined unit corresponds to a plurality of recording elements.

9. A recording head being corrected by a method for correcting a recording head according to claim 1 or claim 6.

10. A recording head correction apparatus adapted to execute a method for correcting a recording head according to claim 1 or claim 6.

11. A recording head according to claim 9, comprising:

input means for inputting recording data from an external; and driving means for driving said plurality of recording elements in accordance with the recording data inputted by said input means.

12. A recording head according to claim 9, wherein said memory means includes an EEPROM.

13. A recording head according to claim 9, wherein the number of said plurality of recording elements in N, and said head is configured by arranging N/M circuit substrates each having M recording elements.

14. A recording head according to claim 9, wherein the number of said plurality of recording elements is N, and said head is formed by mounting N/M driving integrated circuits each corresponding to M recording elements on the substrate having thereon N recording elements arranged in one line, or by connecting the substrate having hereon said driving integrated circuits with the substrate having thereon said N recording elements arranged in one line.

15. A recording head according to claim 9, wherein said mains for generating correction data is formed by the circuit substrate on the recording head or by a part of the driving integrated circuits.

16. A recording head according to claim 9, wherein said means for generating correction data is formed by said circuit substrate of the recording head or by a part of the driving integrated circuits to make an appropriate correction method selectable.

17. A recording head according to claim 9, wherein said recording head is an ink jet recording head for recording by discharging ink.

18. A recording head according to claim 9, wherein said recording head is a recording head for discharging ink by the utilization of thermal energy, and said recording elements are provided with thermal energy converting devices for generating thermal energy applied to said recording elements, respectively.

19. A recording apparatus using a recording head according to claim 9, comprising:

reception means for receiving said correction data from said recording head;

control means for generating control signals for controlling the operation of said driving means so as to enable each of said plural recording elements to form images uniformly in accordance with said correction data; and transmission means for transmitting said control signals to said recording head.

20. A recording apparatus using a recording head according to claim 9, comprising:

control means for receiving the initial correction data from said recording head to appropriately select said initial correction data and the arbitrary correction data generated by said correction data generating means, and then, to generate the control signals for controlling said driving means; and transmission means for transmitting said control signals to said recording head.

* * * * *

UNITED STATES PATENT AND TRADEMARK OFFICE

CERTIFICATE OF CORRECTION

PATENT NO. : 6,377,358 B1
DATED : April 23, 2002
INVENTOR(S) : Kimiyuki Hayasaki et al.

It is certified that error appears in the above-identified patent and that said Letters Patent is hereby corrected as shown below:

Column 1,
Line 50, "responsability" should read -- responsivity --.

Column 3,
Line 1, "correlationship between" should read -- correlation with --.

Column 20,
Line 8, "predetermine" should read -- predetermined --;
Line 62, "external;" should read -- external source; --.

Column 21,
Line 4, "in" should read -- is --;
Line 12, "hereon" should read -- thereon --;
Line 16, "mains" should read -- means --.

Signed and Sealed this

Fourth Day of March, 2003

JAMES E. ROGAN
*Director of the United States Patent and Trademark Office*